US012742662B2

(12) United States Patent
Hiyoshi

(10) Patent No.: US 12,742,662 B2
(45) Date of Patent: Sep. 22, 2026

(54) INERTIAL MEASUREMENT DEVICE

(71) Applicant: SEIKO EPSON CORPORATION, Tokyo (JP)

(72) Inventor: Yasunori Hiyoshi, Suwa (JP)

(73) Assignee: SEIKO EPSON CORPORATION (JP)

(*) Notice: Subject to any disclaimer, the term of this patent is extended or adjusted under 35 U.S.C. 154(b) by 373 days.

(21) Appl. No.: 18/389,917

(22) Filed: Dec. 20, 2023

(65) Prior Publication Data

US 2024/0210209 A1 Jun. 27, 2024

(30) Foreign Application Priority Data

Dec. 21, 2022 (JP) ................................ 2022-204119

(51) Int. Cl.
*G01D 1/04* (2006.01)
*G01P 15/08* (2006.01)

(52) U.S. Cl.
CPC ........... *G01D 1/04* (2013.01); *G01P 15/0802* (2013.01)

(58) Field of Classification Search
CPC ................................ G01D 1/04; G01P 15/08
See application file for complete search history.

(56) References Cited

U.S. PATENT DOCUMENTS 7,996,146 B2 * 8/2011 Ruiz .................. F02D 41/1497 123/436
10,670,424 B2 * 6/2020 Ren ..................... G01C 21/188
11,656,242 B2 * 5/2023 Sato ..................... G01C 25/005 702/96
12,210,635 B2 * 1/2025 Hadi ..................... G06F 40/253
12,366,588 B2 * 7/2025 Otani ........................ G01P 3/44
2019/0285663 A1 * 9/2019 Chino ..................... G01P 15/18
2020/0021787 A1 * 1/2020 Someya ............... G03B 21/145
2020/0355503 A1 * 11/2020 Chen ...................... G01C 19/00
2021/0270635 A1 9/2021 Takeda et al.
2021/0389344 A1 12/2021 Hiyoshi
2022/0317146 A1 * 10/2022 Otani ...................... G01P 15/18
2023/0048524 A1 2/2023 Amano et al.

FOREIGN PATENT DOCUMENTS

| | | | |
|---|---|---|---|
| JP | 2013-170904 | A | 9/2013 |
| JP | 2021-196191 | A | 12/2021 |
| WO | 2020/045099 | A1 | 3/2020 |
| WO | 2021/152884 | A1 | 8/2021 |
| WO | 2022-004375 | A1 | 1/2022 |

* cited by examiner

*Primary Examiner* — Henry Tsai
*Assistant Examiner* — Christopher A Daley
(74) *Attorney, Agent, or Firm* — Harness, Dickey & Pierce, P.L.C.

(57) ABSTRACT

A inertial measurement device includes: a first inertial measurement unit to an n-th inertial measurement unit; a relay circuit configured to receive first detection data to n-th detection data from the first inertial measurement unit to the n-th inertial measurement unit and output the first detection data to the n-th detection data as output data in a time-division manner; and a processing device configured to receive the output data from the relay circuit and perform synthesis processing on the first detection data to the n-th detection data.

14 Claims, 13 Drawing Sheets

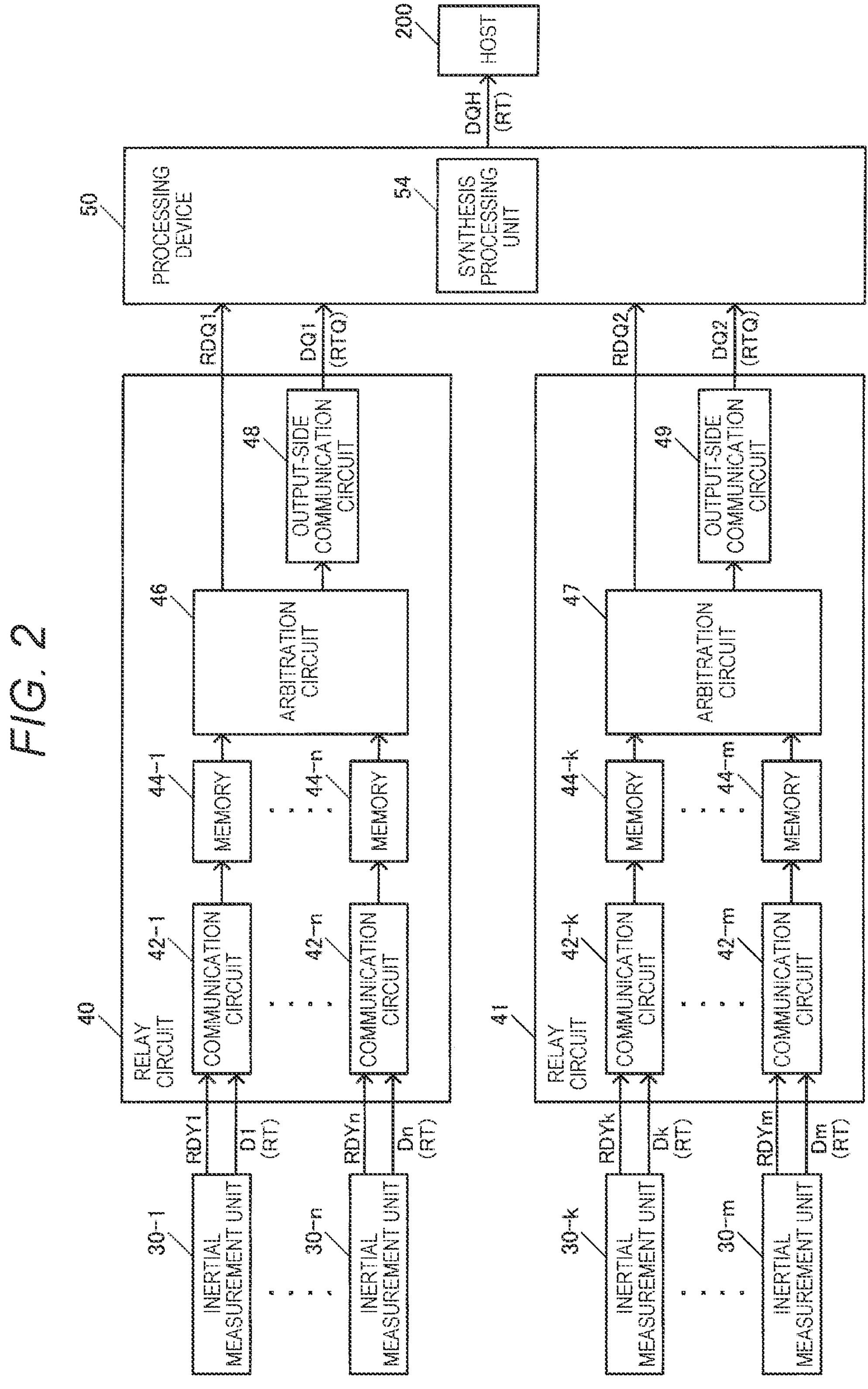
FIG. 2
200
HOST
DQH (RT)
50
PROCESSING DEVICE
54
SYNTHESIS PROCESSING UNIT
RDQ1
DQ1 (RTQ)
RDQ2
DQ2 (RTQ)
40
RELAY CIRCUIT
42-1
COMMUNICATION CIRCUIT
42-n
COMMUNICATION CIRCUIT
44-1
MEMORY
44-n
MEMORY
46
ARBITRATION CIRCUIT
48
OUTPUT-SIDE COMMUNICATION CIRCUIT
41
RELAY CIRCUIT
42-k
COMMUNICATION CIRCUIT
42-m
COMMUNICATION CIRCUIT
44-k
MEMORY
44-m
MEMORY
47
ARBITRATION CIRCUIT
49
OUTPUT-SIDE COMMUNICATION CIRCUIT
30-1
INERTIAL MEASUREMENT UNIT
30-n
INERTIAL MEASUREMENT UNIT
30-k
INERTIAL MEASUREMENT UNIT
30-m
INERTIAL MEASUREMENT UNIT
RDY1
D1 (RT)
RDYn
Dn (RT)
RDYk
Dk (RT)
RDYm
Dm (RT)

CK
TIMER
56
CKSY
54
SYNTHESIS PROCESSING UNIT
58
HOST COMMUNICATION UNIT
DQH (RT)
HOST
PROCESSING DEVICE
STORAGE MEMORY M1 (D1)
STORAGE MEMORY M2 (D2)
STORAGE MEMORY M3 (D3)
STORAGE MEMORY M9 (D9)
52
COMMUNI-CATION UNIT
50
DQ1 (RTQ)
DQ2 (RTQ)
DQ3 (RTQ)
RELAY CIRCUIT RL1
RELAY CIRCUIT RL2
RELAY CIRCUIT RL3
D1 (RT)
D2 (RT)
D3 (RT)
D9 (RT)
IMU1
IMU2
IMU3
IMU9
10

FIG. 4

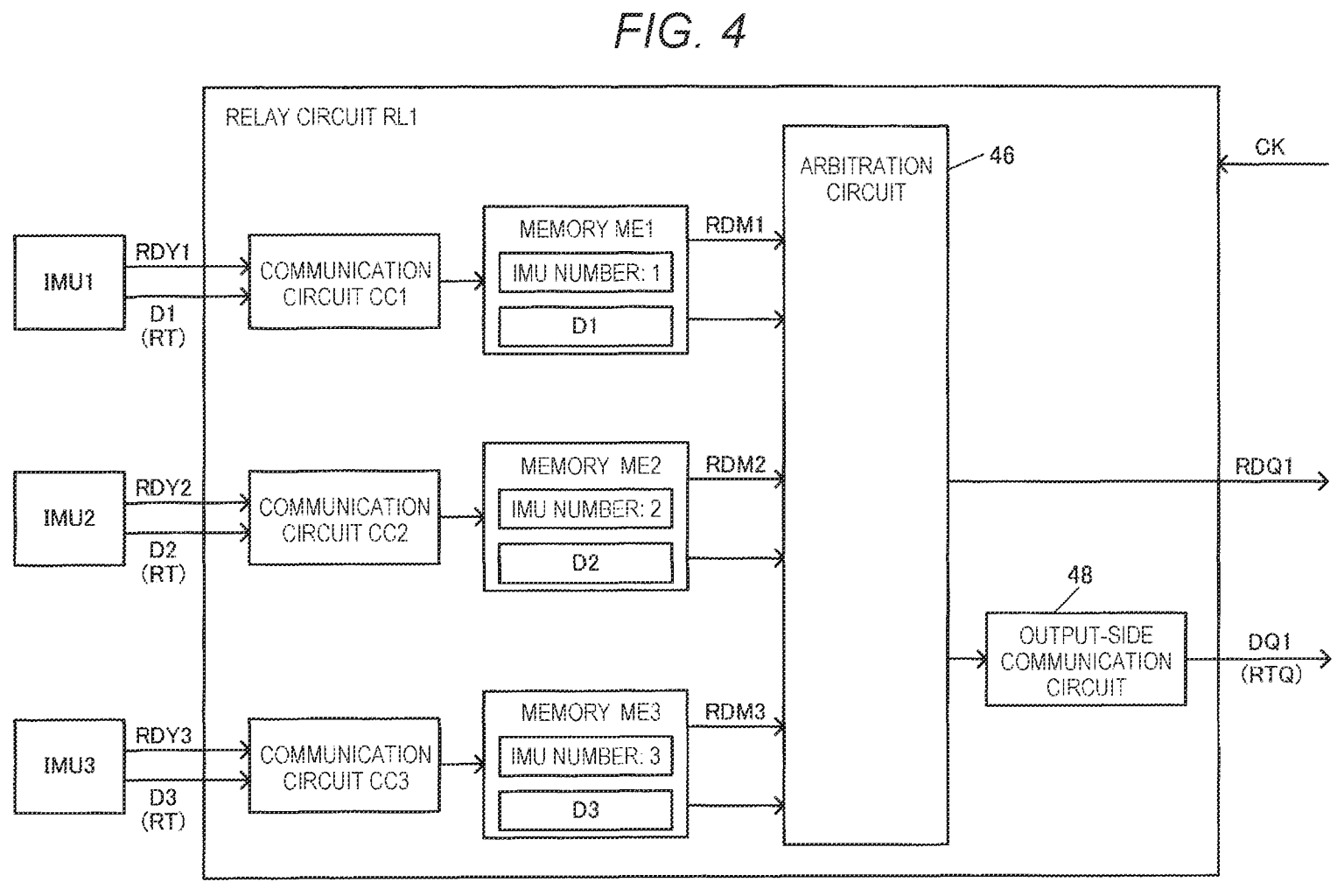

CK
RDQ1
DQ1 (RTQ)
RELAY CIRCUIT RL1
46
ARBITRATION CIRCUIT
48
OUTPUT-SIDE COMMUNICATION CIRCUIT
RDM1
RDM2
RDM3
MEMORY ME1
IMU NUMBER: 1
D1
MEMORY ME2
IMU NUMBER: 2
D2
MEMORY ME3
IMU NUMBER: 3
D3
COMMUNICATION CIRCUIT CC1
COMMUNICATION CIRCUIT CC2
COMMUNICATION CIRCUIT CC3
RDY1
D1 (RT)
RDY2
D2 (RT)
RDY3
D3 (RT)
IMU1
IMU2
IMU3

FIG. 5

50
PROCESSING DEVICE
56
TIMER
CKSY
54
SYNTHESIS PROCESSING UNIT
58
HOST COMMUNICATION UNIT
200
HOST
STORAGE MEMORY M1 (D1)
STORAGE MEMORY M2 (D2)
STORAGE MEMORY M3 (D3)
STORAGE MEMORY M9 (D9)
A1
D1
D2
D3
D9
IMU1
IMU2
IMU3
IMU9

FIG. 8

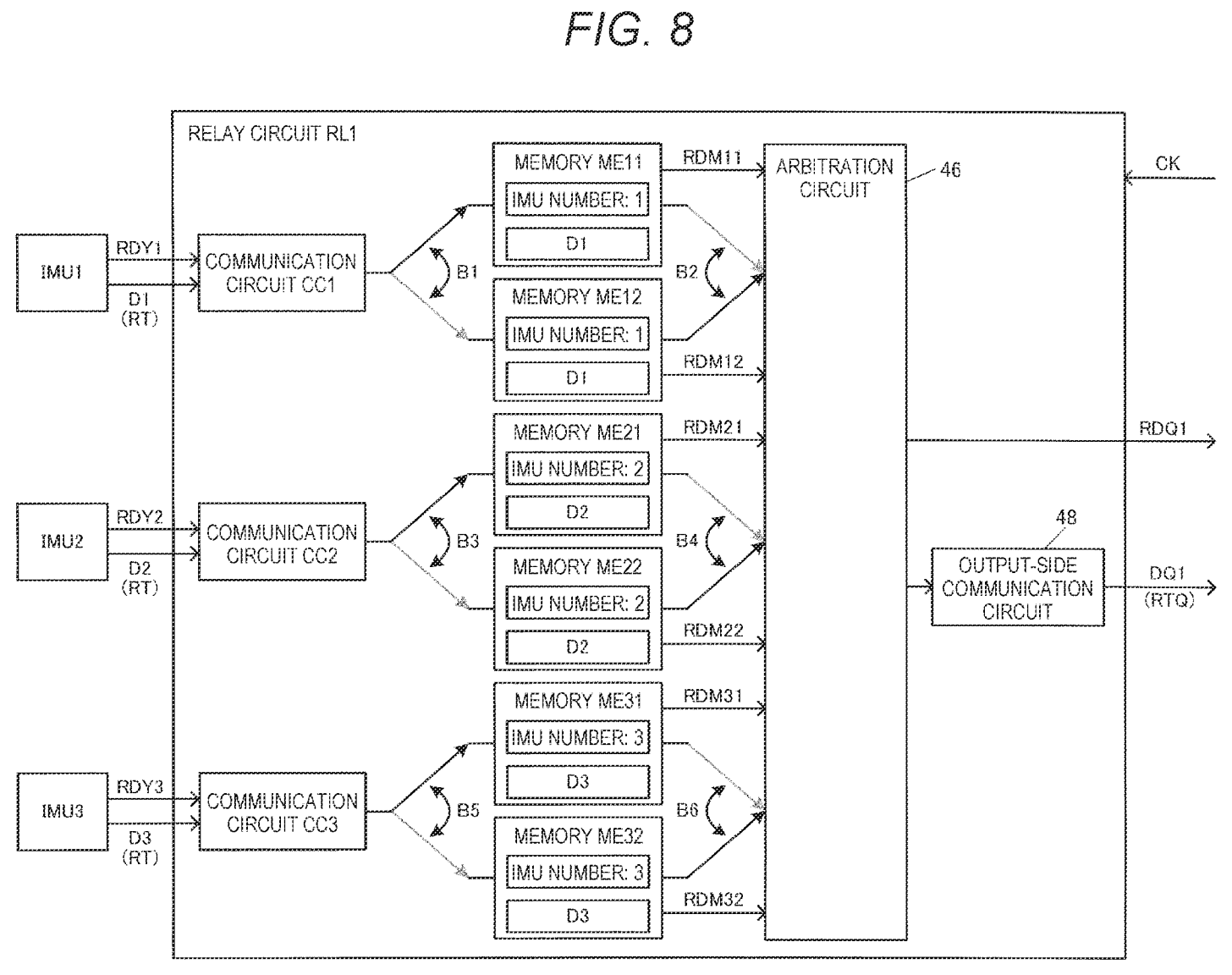

RELAY CIRCUIT RL1
IMU1
IMU2
IMU3
RDY1
D1 (RT)
RDY2
D2 (RT)
RDY3
D3 (RT)
COMMUNICATION CIRCUIT CC1
COMMUNICATION CIRCUIT CC2
COMMUNICATION CIRCUIT CC3
B1
B3
B5
MEMORY ME11
IMU NUMBER: 1
D1
MEMORY ME12
IMU NUMBER: 1
D1
MEMORY ME21
IMU NUMBER: 2
D2
MEMORY ME22
IMU NUMBER: 2
D2
MEMORY ME31
IMU NUMBER: 3
D3
MEMORY ME32
IMU NUMBER: 3
D3
B2
B4
B6
RDM11
RDM12
RDM21
RDM22
RDM31
RDM32
46
ARBITRATION CIRCUIT
48
OUTPUT-SIDE COMMUNICATION CIRCUIT
CK
RDQ1
DQ1 (RTQ)

FIG. 9

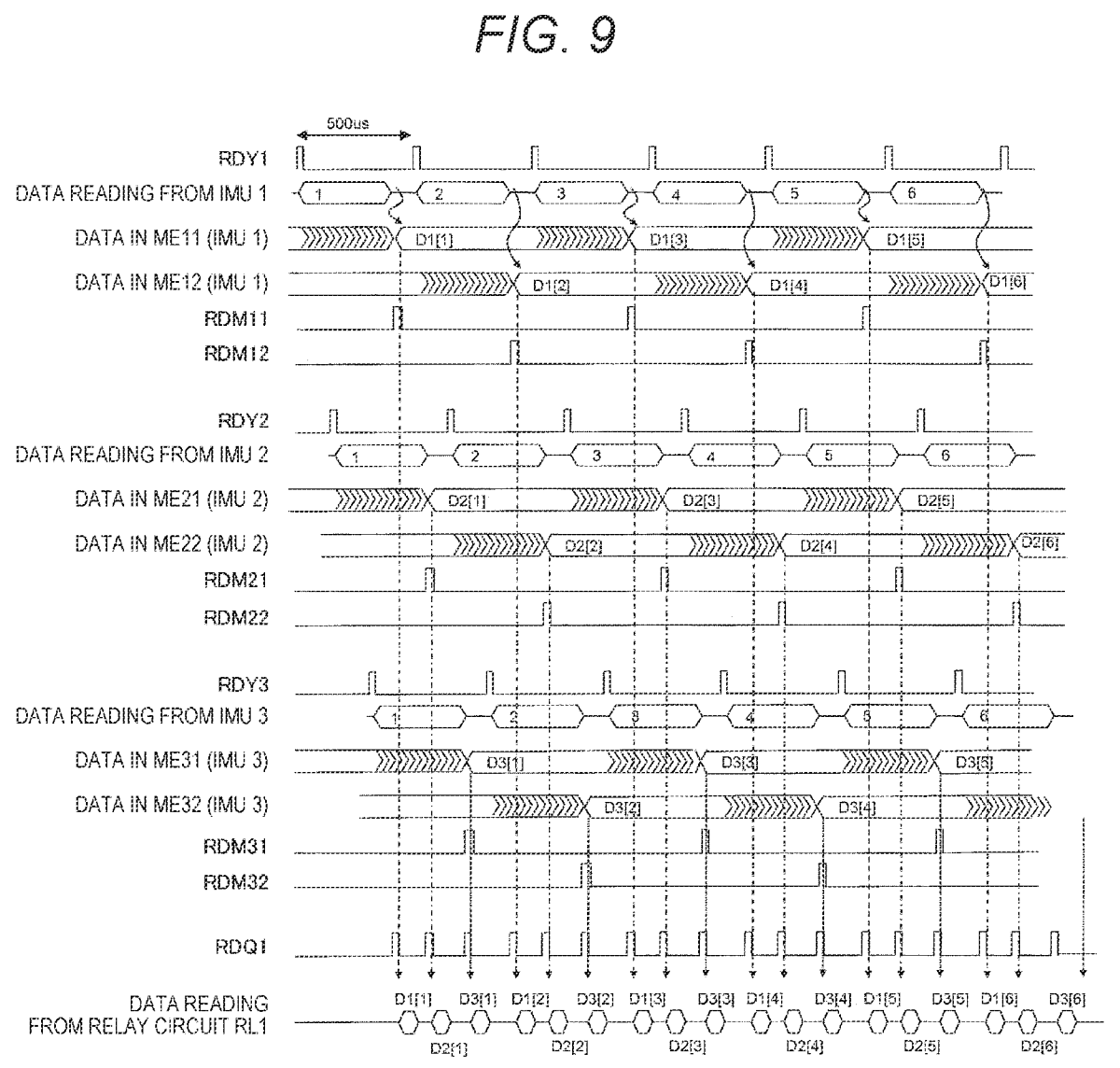

500us
RDY1
DATA READING FROM IMU 1
DATA IN ME11 (IMU 1)
DATA IN ME12 (IMU 1)
RDM11
RDM12
RDY2
DATA READING FROM IMU 2
DATA IN ME21 (IMU 2)
DATA IN ME22 (IMU 2)
RDM21
RDM22
RDY3
DATA READING FROM IMU 3
DATA IN ME31 (IMU 3)
DATA IN ME32 (IMU 3)
RDM31
RDM32
RDQ1
DATA READING FROM RELAY CIRCUIT RL1
D1[1] D1[2] D1[3] D1[4] D1[5] D1[6]
D2[1] D2[2] D2[3] D2[4] D2[5] D2[6]
D3[1] D3[2] D3[3] D3[4] D3[5] D3[6]

FIG. 11
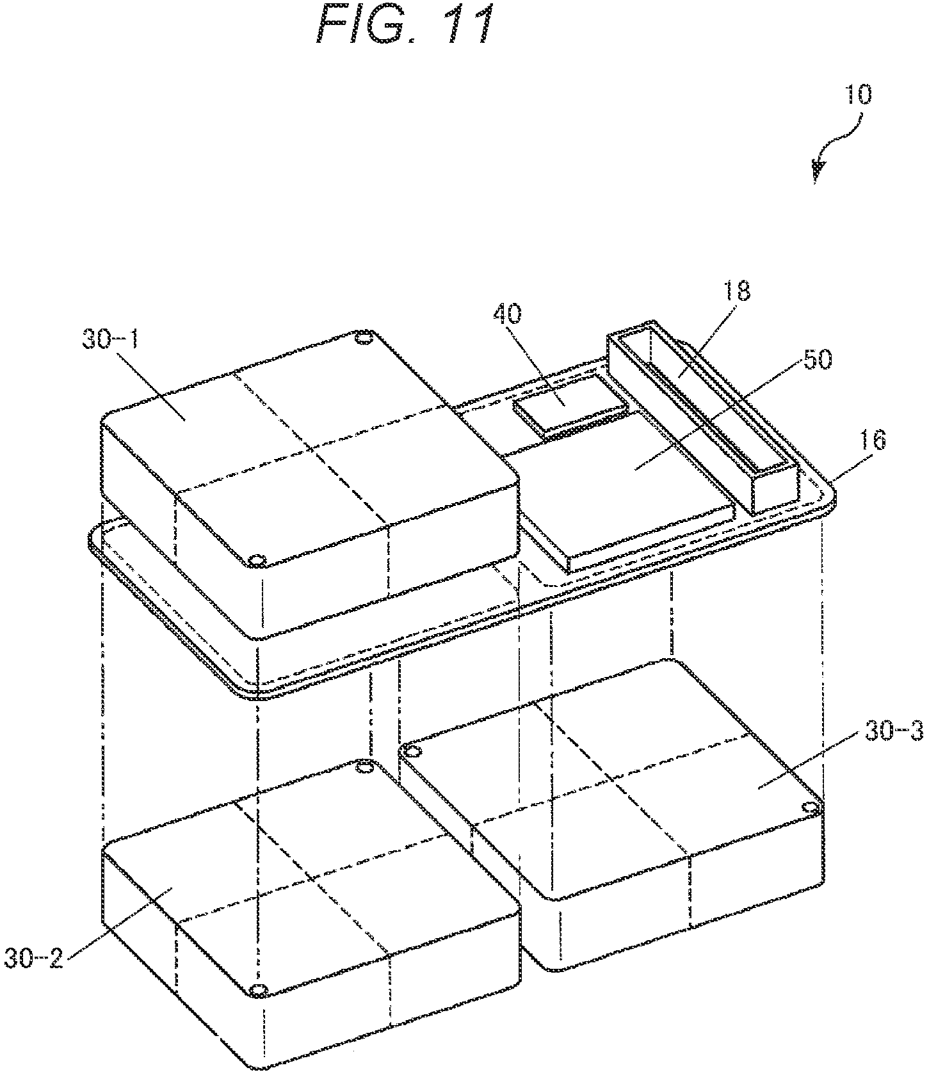
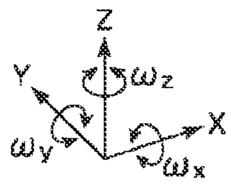

INERTIAL MEASUREMENT DEVICE

The present application is based on, and claims priority from JP Application Serial Number 2022-204119, filed Dec. 21, 2022, the disclosure of which is hereby incorporated by reference herein in its entirety.

BACKGROUND

1. Technical Field

The present disclosure relates to an inertial measurement device or the like.

2. Related Art

JP-A-2021-196191 discloses an inertial measurement device including a plurality of inertial measurement units. In the related art of JP-A-2021-196191, misalignment of three axes of X, Y, and Z is corrected for each of the plurality of inertial measurement units, and after the correction, axis alignment of the inertial measurement units is performed.

In such an inertial measurement device, for example, when the number of inertial measurement units is increased, a problem occurs in that communication ports of a processing device provided in the inertial measurement device becomes insufficient or a data output rate of detection data output from the inertial measurement device decreases. Therefore, there is a problem that the number of inertial measurement units provided in the inertial measurement device is limited.

SUMMARY

An aspect of the present disclosure relates to an inertial measurement device including: a first inertial measurement unit to an n-th inertial measurement unit; a relay circuit configured to receive first detection data to n-th detection data from the first inertial measurement unit to the n-th inertial measurement unit and output the first detection data to the n-th detection data as output data in a time-division manner; and a processing device configured to receive the output data from the relay circuit and perform synthesis processing on the first detection data to the n-th detection data.

BRIEF DESCRIPTION OF THE DRAWINGS

FIG. 2 is a detailed configuration example of the inertial measurement device according to the embodiment.

FIG. 4 is the specific first configuration example according to the embodiment.

FIG. 5 is a timing chart showing an operation of the first configuration example.

FIG. 8 is a specific second configuration example according to the embodiment.

FIG. 9 is a timing chart showing an operation of the second configuration example.

FIG. 11 is an exploded perspective view showing the inertial measurement device.

DESCRIPTION OF EMBODIMENTS

Hereinafter, preferred embodiments of the present disclosure will be described in detail. The embodiments to be described below do not unduly limit contents described in the claims, and not all configurations described in the embodiments are necessarily essential components.

1. Configuration Example of Inertial Measurement Device

Figure 1:
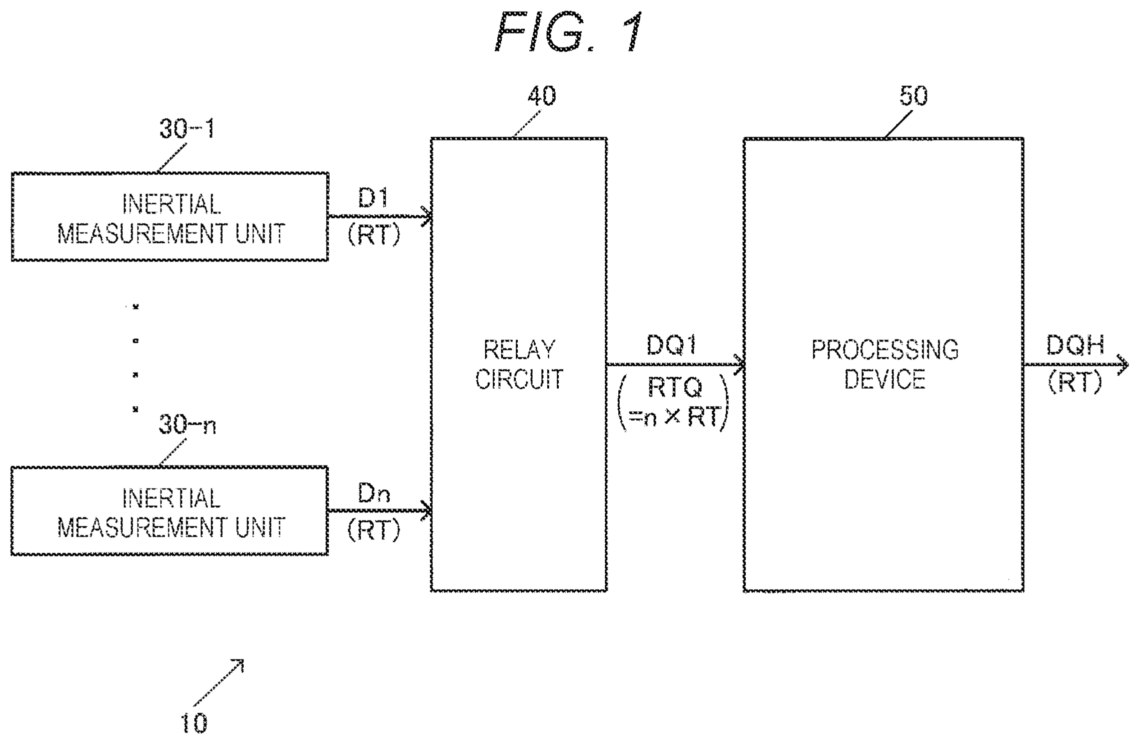
FIG. 1 is a configuration example of an inertial measurement device according to an embodiment.

FIG. 1 shows a configuration example of an inertial measurement device 10 according to the embodiment. The inertial measurement device 10 includes inertial measurement units 30-1 to **30-*n*, a relay circuit 40, and a processing device 50. The inertial measurement units 30-1 to 30-*n*** are a first inertial measurement unit to an n-th inertial measurement unit. Here, n is an integer of 2 or more.

The inertial measurement device 10 detects inertial information. The inertial information is, for example, acceleration data or angular velocity data. The inertial measurement device 10 is, for example, a six-axis inertial measurement device that detects a three-axis acceleration and a three-axis angular velocity. By using the inertial measurement device 10 of six degrees of freedom (6-DoF), it is possible to detect a posture of a vehicle such as an automobile or a moving body such as a robot, a behavior which is an inertial momentum, vibration of a structure or device, or the like. However, the inertial information detected by the inertial measurement device 10 and the number of detection axes are not limited thereto.

The inertial measurement device 10 detects the inertial information by a plurality of the inertial measurement units 30-1 to **30-*n*. Each of the inertial measurement units 30-1 to 30-*n*** includes, for example, an acceleration sensor device and an angular velocity sensor device. The acceleration sensor device detects accelerations in an X-axis direction, a Y-axis direction, and a Z-axis direction. The acceleration sensor device may detect the accelerations in three axes by one acceleration sensor device, or a plurality of acceleration sensor devices in which each acceleration sensor device detects one axis or a plurality of axes may be provided. The angular velocity sensor device detects, for example, angular velocities around the X-axis, the Y-axis, and the Z-axis. In this case, an X-axis angular velocity sensor device, a Y-axis angular velocity sensor device, and a Z-axis angular velocity sensor device can be provided as the angular velocity sensor device. The angular velocity sensor device may detect the angular velocities in three axes by one angular velocity sensor device, or a plurality of angular velocity sensor devices in which each angular velocity sensor device detects one axis or the plurality of axes may be provided.

The relay circuit 40 receives detection data D1 to Dn from the inertial measurement units 30-1 to **30-*n*. The relay circuit 40 may also be referred to as a relay device. The detection data D1 to Dn are first detection data to n-th detection data received from the first inertial measurement unit to the n-th inertial measurement unit. Then, the relay circuit 40 outputs the detection data D1 to Dn as output data DQ1 in a time-division manner. The detection data D1 to Dn are the inertial information measured by the inertial measurement units 30-1 to 30**-*n*. Each piece of the detection data D1 to Dn includes acceleration data and angular velocity data detected by a respective one of the inertial measurement units 30-1 to 30-*n*. Detection data may include various types of data such as error detection code data and temperature detection data. Communication between each inertial measurement unit and the relay circuit 40 is, for example, serial communication, and each of the inertial measurement units 30-1 to 30-*n* outputs data such as the acceleration data and the angular velocity data as, for example, serial data to the relay circuit 40. For example, when the detection data is received from each inertial measurement unit in an order of the detection data D1, D2, . . . Dn, the relay circuit 40 outputs the detection data D1, D2, . . . Dn as the output data DQ1 in that order to the processing device 50. The output order of the detection data from the inertial measurement units is free, and for example, the detection data is output in an order corresponding to detection timings in the inertial measurement units. That is, each piece of the detection data D1 to Dn is input to the relay circuit 40 in an order of detection timings of the inertial information in a respective one of the inertial measurement units 30-1 to 30-*n*. Then, the relay circuit 40 outputs each piece of the detection data D1 to Dn as the output data DQ1 to the processing device 50 in the order of the detection timings.

The processing device 50 receives the output data DQ1 from the relay circuit 40 and performs synthesis processing on the detection data D1 to Dn. The processing device 50 may be referred to as a processing circuit. For example, the processing device 50 performs synthesis processing on the detection data D1 of the inertial measurement unit 30-1, the detection data D2 of the inertial measurement unit 30-2, . . . the detection data Dn of the inertial measurement unit 30-*n*. For example, the processing device 50 performs synthesis processing such as averaging processing on the detection data D1 to Dn received at the same timing, and outputs data DQH after the synthesis processing. The processing device 50 can be implemented by a processor such as an MPU or a CPU. For example, the processing device 50 is called a microcontroller. Alternatively, the processing device 50 may be implemented by an ASIC using automatic arrangement wiring such as a gate array.

As described above, in the inertial measurement device 10 according to the embodiment, the detection data D1 to Dn from the inertial measurement units 30-1 to 30-*n* are input to the relay circuit 40, and the relay circuit 40 outputs the detection data D1 to Dn as the output data DQ1 in a time-division manner. Then, the processing device 50 performs the synthesis processing on the detection data D1 to Dn based on the output data DQ1 from the relay circuit 40. Thus, even when the number of communication ports of the processing device 50 is limited, the detection data D1 to Dn from the inertial measurement units 30-1 to 30-*n* can be input to the processing device 50 as the output data DQ1 in a time-division manner via the relay circuit 40. Since the processing device 50 performs the synthesis processing on the detection data D1 to Dn, it is possible to reduce noise of the data DQH after the synthesis processing as compared with, for example, the case of using the detection data from one inertial measurement unit. For example, by performing the synthesis processing on the detection data D1 to Dn of the n inertial measurement units 30-1 to 30-*n*, random noise of the data DQH after the synthesis processing can be reduced to, for example, $1/n^{1/2}$. Accordingly, it is possible to provide the inertial measurement device 10 capable of easily reducing noise of output data by increasing the number of inertial measurement units provided in the inertial measurement device 10.

The processing device 50 performs synthesis processing on first axis detection data included in the detection data D1 to Dn. The processing device 50 performs synthesis processing on second axis detection data included in the detection data D1 to Dn. The first axis detection data is, for example, acceleration data in a first axis direction and angular velocity data about a first axis. The second axis detection data is, for example, acceleration data in a second axis direction or angular velocity data about a second axis. The first axis is, for example, one of the X-axis, the Y-axis, and the Z-axis, and the second axis is an axis other than the first axis among the X-axis, the Y-axis, and the Z-axis. Further, the processing device 50 performs, for example, synthesis processing on third axis detection data included in the detection data D1 to Dn. The third axis detection data is, for example, acceleration data in a third axis direction or angular velocity data about a third axis. The third axis is an axis other than the first axis and the second axis among the X-axis, the Y-axis, and the Z-axis. When the detection data D1 to Dn include detection data DA1 to DAn of the first axis and detection data DB1 to DBn of the second axis, the processing device 50 performs synthesis processing on the detection data DA1 to DAn of the first axis and synthesis processing on the detection data DB1 to DBn of the second axis. When the detection data D1 to Dn include detection data DC1 to DCn of the third axis, the processing device 50 performs synthesis processing on the detection data DC1 to DCn of the third axis. Thus, the synthesis processing on the first axis detection data and the second axis detection data included in the detection data D1 to Dn is performed, and noise of the first axis detection data and the second axis detection data after the synthesis processing can be reduced. For example, random noise of the first axis detection data and the second axis detection data after the synthesis processing can be reduced to $1/n^{1/2}$.

The synthesis processing performed by the processing device 50 is, for example, averaging processing. For example, the processing device 50 performs the averaging processing on the detection data D1 to Dn and outputs the data DQH after the averaging processing. For example, the processing device 50 performs the averaging processing on the detection data D1 to Dn corresponding to the same detection timing, and outputs the data DQH. The averaging processing is, for example, addition averaging. By performing such averaging processing, random noise of the data DQH output by the processing device 50 can be reduced to, for example, $1/n^{1/2}$ as compared with, for example, the case of using detection data from one inertial measurement unit.

As shown in FIG. 1, the inertial measurement units 30-1 to 30-*n* output the detection data D1 to Dn at a data output rate RT. Then, the relay circuit 40 outputs the output data DQ1 at a data output rate RTQ=n×RT. The unit of the data output rate is, for example, samples per second (sps), and is the number of pieces of sample data per second, which is a unit time. The sample data of the detection data D1 to Dn is data including detection data of a plurality of axes. For example, the sample data of the detection data D1 to Dn is data including the first axis detection data, the second axis detection data, and the third axis detection data. Then, when outputting the detection data D1 to Dn in a time-division manner, the relay circuit 40 outputs the detection data D1 to Dn as the output data DQ1 at the data output rate RTQ=n× RT which is n times the data output rate RT of the inertial measurement units 30-1 to **30-*n*. Thus, the detection data D1 to Dn can be input as the output data DQ1 to the processing device 50 in a time-division manner at the data output rate RTQ which is n times the data output rate RT of the inertial measurement units 30-1 to 30-*n*. Accordingly, for example, even when the number of communication ports of the processing device 50 is limited, the detection data D1 to Dn which are targets of the synthesis processing on the processing device 50 can be input to the processing device 50** at the high data output rate RTQ=n×RT.

The data output rate RTQ may be higher than n×RT. That is, RTQ≥n×RT, and the relay circuit 40 can output the output data DQ1 at the data output rate RTQ of n×RT or more.

The processing device 50 outputs the data DQH after the synthesis processing at the data output rate RT. For example, the processing device 50 outputs the data DQH after the synthesis processing on the detection data D1 to Dn at the same data output rate RT as the data output rate RT of the inertial measurement units 30-1 to **30-*n*. For example, the detection data D1 to Dn are input as the output data DQ1 to the processing device 50 in a time-division manner at the data output rate RTQ which is n times the data output rate RT of the inertial measurement units 30-1 to 30-*n*. Accordingly, the processing device 50 can output the data DQH after the synthesis processing at the same data output rate RT as that of the inertial measurement units 30-1 to 30-*n* by performing the synthesis processing on the detection data D1 to Dn input at a high speed of n times the data output rate RT. Thus, the noise of the data DQH output from the processing device 50 can be further reduced by the synthesis processing, and the data DQH after the synthesis processing can be output at the data output rate RT equivalent to that of the inertial measurement units 30-1 to 30-*n*. Accordingly, the data DQH after the synthesis processing can be output to the outside at the data output rate RT according to a performance of the data output rate of the inertial measurement units 30-1 to 30-*n*. As one example, the data output rate RT of the inertial measurement units 30-1 to 30-*n* is, for example, 2 ksps, and when n=3, the data output rate RTQ of the relay circuit 40 is 2 ksps×n=6 ksps. Then, the processing device 50 outputs the data DQH after the synthesis processing at the data output rate RT=2 ksps equivalent to that of the inertial measurement units 30-1 to 30-*n***.

The data output rate of the data DQH after the synthesis processing performed by the processing device 50 is not limited to being the same as the data output rate of the inertial measurement units 30-1 to **30-*n*, and may be lower than the data output rate of the inertial measurement units 30-1 to 30-*n*. That is, the processing device 50 can output the data DQH after the synthesis processing at the data output rate RT or less. Alternatively, the data output rate of the data DQH may be higher than the data output rate of the inertial measurement units 30-1 to 30-*n***.

FIG. 2 shows a detailed configuration example of the inertial measurement device 10 according to the embodiment. The inertial measurement device 10 in FIG. 2 further includes inertial measurement units **30-*k* to 30-*m* and a relay circuit 41 in addition to the configuration in FIG. 1. The data DQH after the synthesis processing from the processing device 50 is output to, for example, a host 200. The host 200 is, for example, a personal computer (PC) or a microcontroller provided outside the inertial measurement device 10. The inertial measurement device 10 according to the embodiment is not limited to the configuration in FIG. 2**, and various modifications can be implemented, such as omitting a part of components, adding other components, or replacing a part of components with other components. The same applies to other specific configuration examples described later.

The inertial measurement units **30-*k* to 30-*m* are a k-th inertial measurement unit to an m-th inertial measurement unit. Each of the inertial measurement units 30-*k* to 30-*m* includes, for example, an acceleration sensor device and an angular velocity sensor device. Since configurations and operations of the inertial measurement units 30-*k* to 30-*m* are the same as those of the inertial measurement units 30-1 to 30-*n*** described above, detailed description thereof will be omitted.

The relay circuit 41 receives detection data Dk to Dm from the inertial measurement units **30-*k* to 30-*m*, and outputs the detection data Dk to Dm as output data DQ2 in a time-division manner. The relay circuit 41 is a second relay circuit, and can also be referred to as a second relay device. The detection data Dk to Dm are k-th detection data to m-th detection data received from the k-th inertial measurement unit to the m-th inertial measurement unit. The output data DQ2 is second output data. Here, k and m are integers satisfying m−k≥1, for example, k=n+1. Each piece of the detection data Dk to Dm includes the acceleration data and the angular velocity data detected by each of the inertial measurement units 30-*k* to 30-*m*. Communication between each inertial measurement unit and the relay circuit 41 is, for example, serial communication. For example, when the detection data is received from the inertial measurement units in the order of the detection data Dk, Dk+1, . . . Dm, the relay circuit 41 outputs the detection data Dk, Dk+1, . . . Dm as the output data DQ2 in this order. However, the output order of the detection data is free, and each piece of the detection data Dk to Dm is input to the relay circuit 41 in the order of the detection timings of the inertial information in the inertial measurement units 30-*k* to 30-*m*. Then, the relay circuit 41 outputs each piece of the detection data Dk to Dm as the output data DQ2 in the order of the detection timings. Since a configuration and an operation of the relay circuit 41 are also the same as those of the relay circuit 40** which is a first relay circuit, detailed description thereof will be omitted.

The processing device 50 receives the output data DQ1 and the output data DQ2, and performs the synthesis processing on the detection data D1 to Dn and the detection data Dk to Dm. The synthesis processing is performed by a synthesis processing unit 54 provided in the processing device 50. For example, the processing device 50 performs the synthesis processing on the detection data D1 of the inertial measurement unit 30-1, the detection data D2 of the inertial measurement unit 30-2, the detection data Dn of the inertial measurement unit **30-*n*, the detection data Dk of the inertial measurement unit 30-*k*, the detection data Dk+1 of the inertial measurement unit 30-*k*+1, . . . and the detection data Dm of the inertial measurement unit 30-*m*. For example, the processing device 50 performs the synthesis processing such as averaging processing on the detection data D1** to Dn and Dk to Dm received at the same timing, and outputs the data DQH after the synthesis processing.

The inertial measurement units **30-*k* to 30-*m* output the detection data Dk to Dm at the data output rate RT. Then, the relay circuit 41 outputs the output data DQ2 at the data output rate RTQ=(m−k+1)×RT. The sample data of the detection data Dk to Dm is data including the detection data of the plurality of axes, for example, data including the first axis detection data, the second axis detection data, and the third axis detection data. Then, when outputting the detection data Dk to Dm in a time-division manner, the relay circuit 41 outputs the detection data Dk to Dm as the output data DQ2 at the data output rate RTQ which is (m−k+1) times the data output rate RT of the inertial measurement units 30**-*k* to 30-*m*. Here, for example, m−k+1=n.

As described above, in FIG. 2, in addition to the inertial measurement units 30-1 to 30-*n* and the relay circuit 40, the inertial measurement units 30-*k* to 30-*m* and the relay circuit 41 are further provided, and the detection data Dk to Dm from the inertial measurement units 30-*k* to 30-*m* are input to the relay circuit 41. Then, the relay circuit 41 outputs the detection data Dk to Dm as the output data DQ2 in a time-division manner, and the processing device 50 performs the synthesis processing on the detection data D1 to Dn and Dk to Dm. Then, since the synthesis processing is performed using the detection data Dk to Dm from the inertial measurement units 30-*k* to 30-*m* in addition to the detection data D1 to Dn from the inertial measurement units 30-1 to 30-*n*, it is possible to implement a further reduction in noise of the data DQH after the synthesis processing.

For example, when the number of communication ports of the processing device 50 is one, the relay circuit 40 may be provided, and when the number of communication ports of the processing device 50 is two or more, the relay circuit 41 is further provided to connect the relay circuit 40 to a first communication port and connect the relay circuit 41 to a second communication port. For example, when only the relay circuit 40 is provided and the inertial measurement units 30-*k* to 30-*m* in addition to the inertial measurement units 30-1 to 30-*n* are connected to the relay circuit 40, it is necessary to further increase the speed of communication between the relay circuit 40 and the processing device 50. On the other hand, as shown in FIG. 2, when the inertial measurement units 30-1 to 30-*n* are connected to the relay circuit 40 and the inertial measurement units 30-*k* to 30-*m* are connected to the relay circuit 41, the speed of communication between the relay circuit 40 and the processing device 50 and between the relay circuit 41 and the processing device 50 can be made lower than that in the configuration in which only the relay circuit 40 is provided. Accordingly, the processing device 50 can receive the output data DQ1 and DQ2 from the relay circuits 40 and 41 at a communication speed corresponding to the communication port, and output the data DQH having low noise after the synthesis processing.

In FIG. 2, the relay circuit 40 includes communication circuits 42-1 to 42-*n* that receive the detection data D1 to Dn from the inertial measurement units 30-1 to 30-*n*, and an output-side communication circuit 48 that transmits the output data DQ1 to the processing device 50. The communication circuits 42-1 to 42-*n* are a first communication circuit to an n-th communication circuit. Communication between the inertial measurement units 30-1 to 30-*n* and the communication circuits 42-1 to 42-*n* and communication between the output-side communication circuit 48 and the processing device 50 can be implemented by, for example, a serial communication having a given communication standard. Specifically, the communication can be implemented by communication having a communication standard of an SPI or I2C or having a communication standard developed from the SPI or I2C. Alternatively, the communication may be implemented by communication such as UART. The serial peripheral interface (SPI) is synchronous serial communication that performs data communication in synchronization with a clock, and is communication using, for example, four bus lines of a clock signal line, a chip select signal line, and two data signal lines. The inter-integrated circuit (I2C) is semi-duplex serial communication, for example, communication using two bus lines of a clock signal line and a data signal line. Thus, the detection data D1 to Dn from the inertial measurement units 30-1 to 30-*n* can be received by the communication circuits 42-1 to 42-*n*, and the detection data D1 to Dn can be output as the output data DQ1 to the processing device 50 by the output-side communication circuit 48. For example, according to the configuration in FIG. 2, the detection data D1 to Dn can be received at a communication speed allowed in the communication of the communication circuits 42-1 to 42-*n*, and can be received at a communication speed at which the data output rate RT can be secured. For example, in a configuration in which only one communication circuit is provided in the relay circuit 40, it is necessary to increase a communication speed of the communication circuit in order to receive the detection data D1 to Dn from the n inertial measurement units 30-1 to 30-*n* while securing the data output rate RT. On the other hand, as shown in FIG. 2, according to the configuration in which the n communication circuits 42-1 to 42-*n* are provided corresponding to the n inertial measurement units 30-1 to 30-*n*, the detection data D1 to Dn in which the data output rate RT is secured can be easily received. Although the number of communication ports is limited in the processing device 50 such as a microcontroller, for example, according to the relay circuit 40 of the ASIC, there is no such limitation, and there is an advantage that it is easy to provide the n communication circuits 42-1 to 42-*n*. In FIG. 2, one output-side communication circuit 48 is provided as a communication interface of the processing device 50. Accordingly, by communicably connecting the first communication port of the processing device 50 and the output-side communication circuit 48, the output data DQ1 can be output to the processing device 50. Even when the number of communication ports of the processing device 50 is limited, it is possible to cope with the output.

The relay circuit 40 includes memories 44-1 to 44-*n* that store the detection data D1 to Dn from the inertial measurement units 30-1 to 30-*n*. The memories 44-1 to 44-*n* are a first memory to an n-th memory. The memories 44-1 to 44-*n* can be implemented by semi-conductor memories such as RAMs. For example, the detection data D1 to Dn received by the communication circuits 42-1 to 42-*n* are written into the memories 44-1 to 44-*n*. In this case, the memories 44-1 to 44-*n* may operate as FIFO memories. The detection data D1 to Dn written into the memories 44-1 to 44-*n* are read by, for example, an arbitration circuit 46 and transmitted to the processing device 50 via the output-side communication circuit 48. For example, the arbitration circuit 46 reads the detection data D1 to Dn from the memories 44-1 to 44-*n* in an order of reception timings of the detection data D1 to Dn from the inertial measurement units 30-1 to 30-*n*, and transfers the detection data D1 to Dn to the output-side communication circuit 48. The order of the reception timings corresponds to, for example, the order of the detection timings of the inertial measurement units 30-1 to 30-*n*. By providing such memories 44-1 to 44-*n*, the detection data D1 to Dn from the inertial measurement units 30-1 to 30-*n* can be stored in the memories 44-1 to 44-*n*, and the stored detection data D1 to Dn can be output as the output data DQ1 to the processing device 50 in a time-division manner.

In FIG. 2, the relay circuit 41 also includes communication circuits 42-*k* to 42-*m* that receive the detection data Dk to Dm from the inertial measurement units 30-*k* to 30-*m*, and an output-side communication circuit 49 that transmits the output data DQ2 to the processing device 50. The communication circuits 42-*k* to 42-*m* are a k-th communication circuit to an m-th communication circuit, and the output-side communication circuit 49 is a second output-side communication circuit. Thus, the detection data Dk to Dm from the inertial measurement units 30-*k* to 30-*m* can be received by the communication circuits 42-*k* to 42-*m*, and the detection data Dk to Dm can be output as the output data DQ2 to the processing device 50 by the output-side communication circuit 49.

The relay circuit 41 includes memories 44-*k* to 44-*m* that store the detection data Dk to Dm from the inertial measurement units 30-*k* to 30-*m*. The memories 44-*k* to 44-*m* are a k-th memory to an m-th memory. For example, the detection data Dk to Dm received by the communication circuits 42-*k* to 42-*m* are written into the memories 44-*k* to 44-*m*. The detection data Dk to Dm written into the memories 44-*k* to 44-*m* are read by, for example, an arbitration circuit 47 and transmitted to the processing device 50 via the output-side communication circuit 49. By providing such memories 44-*k* to 44-*m*, the detection data Dk to Dm from the inertial measurement units 30-*k* to 30-*m* can be stored in the memories 44-*k* to 44-*m*, and the stored detection data Dk to Dm can be output as the output data DQ2 to the processing device 50 in a time-division manner.

In FIG. 2, the relay circuit 40 receives data ready signals RDY1 to RDYn from the inertial measurement units 30-1 to 30-*n*, and outputs an output data ready signal RDQ1 to the processing device 50. The data ready signals RDY1 to RDYn are a first data ready signal to an n-th data ready signal. The relay circuit 41 receives data ready signals RDYk to RDYm from the inertial measurement units 30-*k* to 30-*m*, and outputs an output data ready signal RDQ2 to the processing device 50. The data ready signals RDYk to RDYm are a k-th data ready signal to an m-th data ready signal, and the output data ready signal RDQ2 is a second output data ready signal. Details of the data ready signal and the output data ready signal will be described later.

2. Specific Configuration Example

Figure 3:
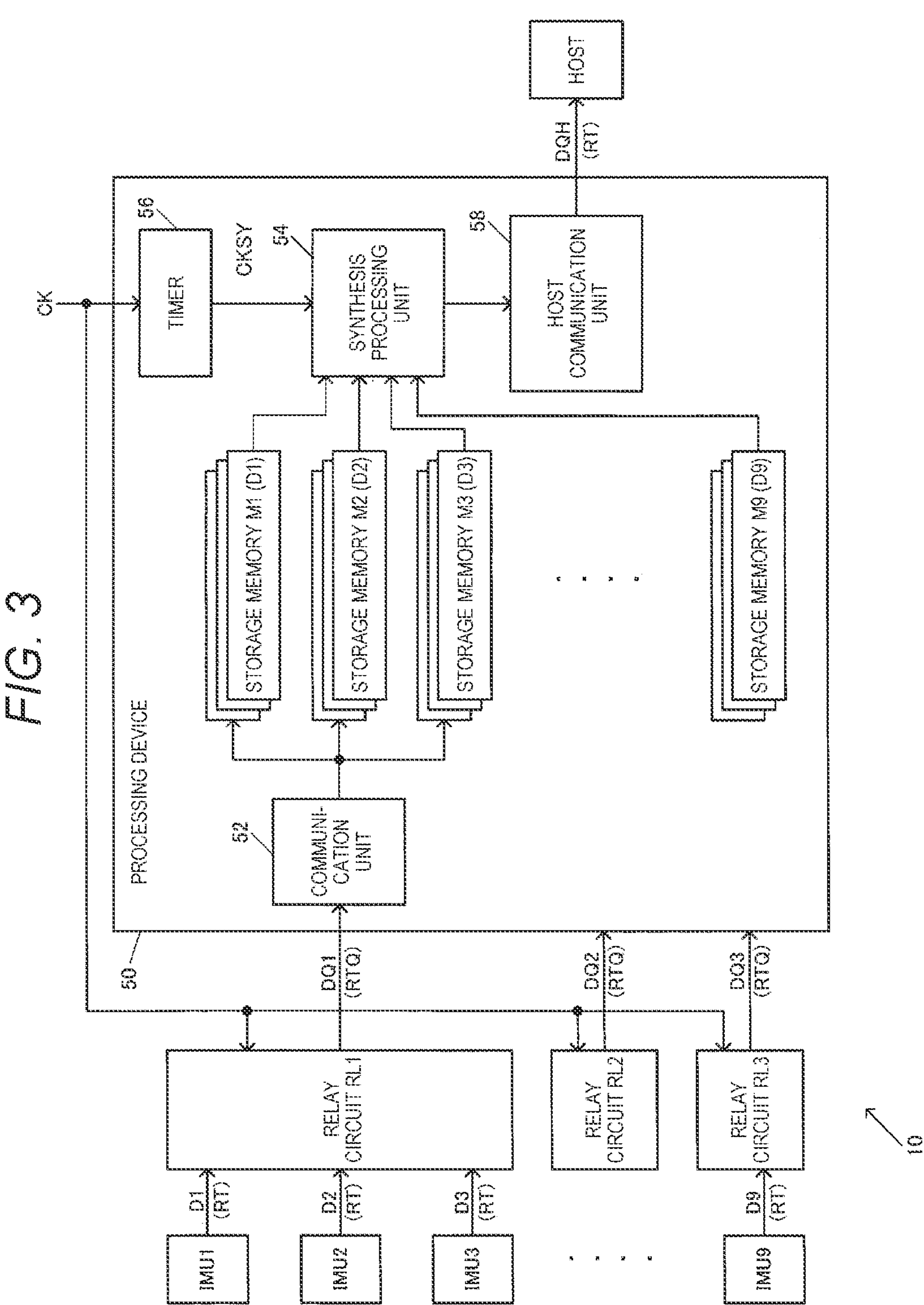
FIG. 3 is a specific first configuration example according to the embodiment.

Next, a specific configuration example of the inertial measurement device 10 according to the embodiment will be described. FIGS. 3 and 4 are diagrams showing a specific first configuration example according to the embodiment. Hereinafter, the inertial measurement unit is referred to as an inertial measurement unit (IMU) as appropriate. A specific example is described in which n, m, and k in FIGS. 1 and 2 are n=m−k+1=3 and three relay circuits RL1, RL2, and RL3 are provided.

For example, there is a problem that the number of communication ports of a processing device such as a control microcomputer is insufficient when a multi-IMU is implemented by combining a larger number of IMUs, as compared with a multi-IMU obtained by combining three IMUs. For example, the communication port with the IMU mounted on the processing device is limited. Therefore, in the embodiment, a relay circuit is introduced. The relay circuit is a communication relay device that converts a plurality of communication ports into one communication port, and a large number of IMUs can be controlled even by a processing device having a small number of communication ports. For example, by combining N IMUs, random noise can be reduced to $1/n^{1/2}$, and a high-precision multi-IMU can be easily implemented. For example, by mounting a larger number of IMUs, it is possible to implement a further high-precision multi-IMU. In the case of SPI communication with the IMU, a plurality of IMUs can be connected to one communication port by adopting an SPI multi-slave connection method, but there is a problem that a data output rate which is a read rate from the IMUs is reduced to, for example, ⅓ by connecting three IMUs. The IMU is an inertial sensor incorporating a three-axis acceleration sensor and a three-axis angular velocity sensor which is a three-axis gyro implementing high stability and high precision by performing temperature correction of bias and sensitivity and orthogonal alignment correction, and is also referred to as a 6-DoF sensor in six axes of three axes+three axes. The IMU is used in a wide range of applications such as behavior analysis and rotation and translation analysis of a device in industrial systems.

In the inertial measurement device 10 in FIG. 3, N=9 of an IMU 1 to an IMU 9 are provided. Accordingly, random noise can be reduced to $1/n^{1/2}$=⅓. For example, the IMU 1, the IMU 2, and the IMU 3 correspond to the inertial measurement units 30-1 to 30-*n* in FIGS. 1 and 2, and the IMU 4, the IMU 5, and the IMU 6 correspond to the inertial measurement units 30-*k* to 30-*m*. In FIG. 3, the IMU 1 to the IMU 3 are connected to the relay circuit RL1, and for example, output the detection data D1 to D3 to the relay circuit RL1 at the data output rate RT. Then, the relay circuit RL1 outputs the detection data D1 to D3 as the output data DQ1 to the processing device 50 in a time-division manner. The relay circuit RL1 corresponds to, for example, the relay circuit 40 in FIGS. 1 and 2. The IMU 4 to the IMU 6 are connected to the relay circuit RL2, and for example, output the detection data D4 to D6 to the relay circuit RL2 at the data output rate RT. Then, the relay circuit RL2 outputs the detection data D4 to D6 as the output data DQ2 to the processing device 50 in a time-division manner. The relay circuit RL2 corresponds to, for example, the relay circuit 41. The IMU 7 to the IMU 9 are connected to the relay circuit RL3, and for example, output the detection data D7 to D9 to the relay circuit RL3 at the data output rate RT. Then, the relay circuit RL3 outputs the detection data D7 to D9 as output data DQ3 to the processing device 50 in a time-division manner.

The processing device 50 includes a communication unit 52, storage memories M1 to M9, the synthesis processing unit 54, a timer 56, and a host communication unit 58. The communication unit 52 receives the output data DQ1 from the relay circuit RL1. The detection data D1, D2, and D3 included in the output data DQ1 are written into the storage memories M1, M2, and M3. The processing device 50 includes a second communication unit and a third communication unit (not shown). The second communication unit receives the output data DQ2 from the relay circuit RL2. The detection data D4, D5, and D6 included in the output data DQ2 are written into the storage memories M4, M5, and M6. The third communication unit receives the output data DQ3 from the relay circuit RL3. The detection data D7, D8, and D9 included in the output data DQ3 are written into the storage memories M7, M8, and M9. The storage memories M1 to M9 may be implemented by, for example, an internal RAM of the processing device 50, or may be implemented by an external RAM.

A first communication unit, the second communication unit, and the third communication unit which are the communication unit 52 correspond to the communication ports of the processing device 50. In FIG. 3, the processing device 50 has three communication ports. In a configuration in which a relay circuit is not provided, for example, the IMU 1, the IMU 2, and the IMU 3 are connected to the three communication ports, and thus the random noise can be reduced only to $⅓^{1/2}$. On the other hand, in FIG. 3, by providing the three relay circuits RL1, RL2, and RL3, N=9 of the IMU 1 to the IMU 9 can be used, and the random noise can be reduced to $1/9^{1/2}=1/3$.

The synthesis processing unit 54 reads the detection data D1 to D9 from the storage memories M1 to M9, and performs the synthesis processing on the detection data D1 to D9. For example, as described above, the synthesis processing unit 54 performs the synthesis processing on the first axis detection data included in the detection data D1 to D9, the synthesis processing on the second axis detection data included in the detection data D1 to D9, and the synthesis processing on the third axis detection data included in the detection data D1 to D9. For example, the first axis detection data is acceleration data in the X-axis or angular velocity data about the X-axis, the second axis detection data is acceleration data in the Y-axis or angular velocity data about the Y-axis, and the third axis detection data is acceleration data in the Z-axis or angular velocity data about the Z-axis. The synthesis processing unit 54 performs synthesis processing on the acceleration data of each of the X-axis, the Y-axis, and the Z-axis included in the detection data D1 to D9, and synthesis processing on the angular velocity data about each of the X-axis, the Y-axis, and the Z-axis included in the detection data D1 to D9.

The timer 56 receives a clock signal CK, and outputs a clock signal CKSY for synchronization to the synthesis processing unit 54 or the like by, for example, counter processing. The host communication unit 58 is a communication unit serving as an interface with the host 200, and communicates with the host 200 according to a given communication standard.

FIG. 4 shows a configuration example of the relay circuit RL1 in the first configuration example. Since the configurations of the relay circuits RL2 and RL3 are the same as that of the relay circuit RL1, detailed description thereof will be omitted.

The relay circuit RL1 includes communication circuits CC1, CC2, and CC3, memories ME1, ME2, and ME3, the arbitration circuit 46, and the output-side communication circuit 48. The communication circuits CC1, CC2, and CC3 correspond to, for example, the communication circuits 42-1 to 42-*n* in FIG. 2. The memories ME1, ME2, and ME3 correspond to, for example, the memories 44-1 to 44-*n*.

The communication circuit CC1 is communicably connected to the IMU 1 and receives the detection data D1 from the IMU 1 by serial communication such as an SPI. The communication circuit CC1 receives the data ready signal RDY1 from the IMU 1. Then, the detection data D1 received by the communication circuit CC1 is written and stored into the memory ME1. Specifically, the memory ME1 stores an IMU number=1 which is identification information of the IMU 1 in association with the detection data D1.

The communication circuit CC2 is communicably connected to the IMU 2 and receives the detection data D2 from the IMU 2 by serial communication such as an SPI. The communication circuit CC2 receives the data ready signal RDY2 from the IMU 2. Then, the detection data D2 received by the communication circuit CC2 is written and stored into the memory ME2. Specifically, the memory ME2 stores an IMU number=2 which is identification information of the IMU 2 in association with the detection data D2.

The communication circuit CC3 is communicably connected to the IMU 3 and receives the detection data D3 from the IMU 3 by serial communication such as an SPI. The communication circuit CC3 receives the data ready signal RDY3 from the IMU 3. Then, the detection data D3 received by the communication circuit CC3 is written and stored into the memory ME3. Specifically, the memory ME3 stores an IMU number=3 which is identification information of the IMU 3 in association with the detection data D3.

The arbitration circuit 46 reads the detection data D1, D2, and D3 from the memories ME1, ME2, and ME3, and transfers the detection data D1, D2, and D3 to the output-side communication circuit 48. For example, data ready signals RDM1, RDM2, and RDM3 from the memories ME1, ME2, and ME3 are input to the arbitration circuit 46. The arbitration circuit 46 reads the detection data D1, D2, and D3 from the memories ME1, ME2, and ME3, for example, in the order of the reception timings of the detection data D1, D2, and D3. The reception timings of the detection data D1, D2, and D3 correspond to, for example, timings at which the data ready signals RDY1, RDY2, and RDY3 become active. The arbitration circuit 46 specifies the timings by, for example, the data ready signals RDM1, RDM2, and RDM3 from the memories ME1, ME2, and ME3. For example, it is assumed that the detection data is received in the order of D1, D2, and D3. In this case, the arbitration circuit 46 reads the detection data from the memories ME1, ME2, and ME3 in the order of D1, D2, and D3 and transfers the detection data to the output-side communication circuit 48. The output-side communication circuit 48 transmits the detection data as the output data DQ1 to the processing device 50 in the order of D1, D2, and D3. For example, it is assumed that the detection data is received in an order of D2, D3, and D1. In this case, the arbitration circuit 46 reads the detection data from the memories ME2, ME3, and ME1 in the order of D2, D3, and D1 and transfers the detection data to the output-side communication circuit 48. The output-side communication circuit 48 transmits the detection data as the output data DQ1 to the processing device 50 in the order of D2, D3, and D1. The arbitration circuit 46 outputs the output data ready signal RDQ1 of DQ1 to the processing device 50.

Figure 5:
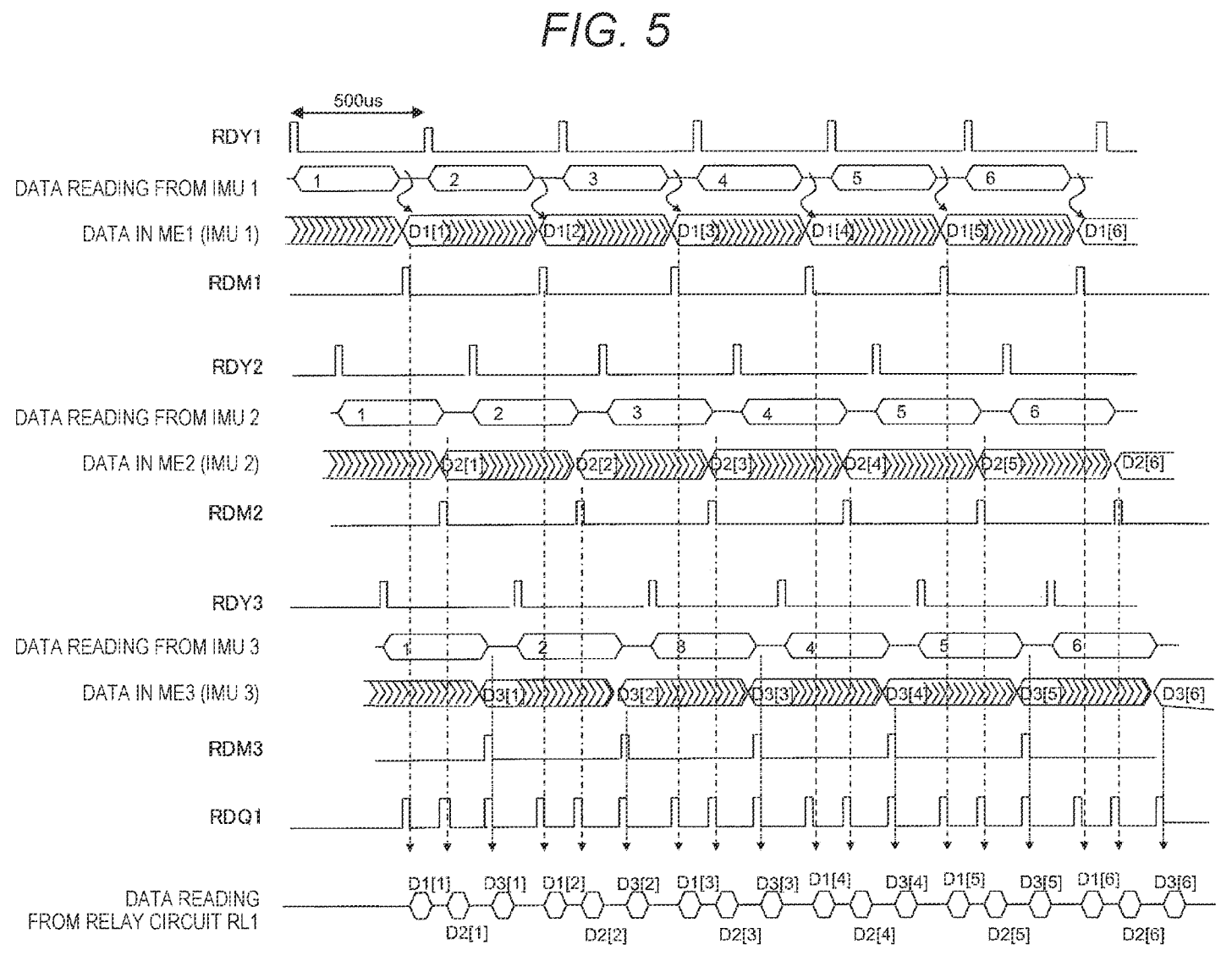

FIG. 5 is a timing chart showing an operation of the first configuration example. FIG. 5 shows an example in which detection data is read from each IMU at, for example, 2 ksps. In this case, the data ready signal RDY1 from the IMU 1 becomes active at a time interval of, for example, about 500 μs, and detection data D1 [1] which is sensor data from the IMU 1 is read in synchronization with the data ready signal RDY1. Then, the detection data D1 [1] read from the IMU 1 via the communication circuit CC1 is stored in the memory ME1 for storing the sensor data. At the same time, the IMU number=1, which is the identification information of the IMU 1, is also stored in the memory ME1. Then, at a timing when the storage of the detection data D1 [1] into the memory ME1 is completed, the data ready signal RDM1 from the memory ME1 becomes active. The data ready signal RDM1 which is an internal output synchronization signal is output as the output data ready signal RDQ1 which is an output synchronization signal to the processing device 50 via the arbitration circuit 46. Then, in synchronization with the output data ready signal RDQ1, the detection data D1 [1] and the IMU number=1 which are contents of the memory ME1 are output to the processing device 50 via the output-side communication circuit 48. Then, the output of the contents of the memory ME1 to the processing device 50 is completed until the next data ready signal RDY1 from the IMU 1 becomes active. By repeating the above-described processing, the detection data D1 [1], D1 [2], D1 [3], . . . from the IMU 1 can be continuously transmitted to the processing device 50.

Similarly, detection data D2 [1] is read from the IMU 2 in synchronization with the data ready signal RDY2. The detection data D2 [1] read from the IMU 2 via the communication circuit CC2 is stored in the memory ME2. At the same time, the IMU number=2, which is the identification information of the IMU 2, is also stored in the memory ME2. Then, at a timing when the storage of the detection data D2 [1] into the memory ME2 is completed, the data ready signal RDM2 from the memory ME2 becomes active. The data ready signal RDM2 is output as the output data ready signal RDQ1 to the processing device 50 via the arbitration circuit 46. Then, in synchronization with the output data ready signal RDQ1, the detection data D2 [1] and the IMU number=2 which are contents of the memory ME2 are output to the processing device 50 via the output-side communication circuit 48. Then, the output of the contents of the memory ME2 to the processing device 50 is completed until the next data ready signal RDY2 from the IMU 2 becomes active. By repeating the above-described processing, the detection data D2 [1], D2 [2], D2 [3] . . . from the IMU 2 can be continuously transmitted to the processing device 50. Similarly, detection data D3 [1], D3 [2], D3 [3] . . . from the IMU 3 are also transmitted from the communication circuit CC3 to the processing device 50 via the memory ME3, the arbitration circuit 46, and the output-side communication circuit 48.

When the three IMU 1, IMU 2, and IMU 3 are connected to the relay circuit RL1 as shown in FIG. 4, the data output rate RTQ corresponding to a communication speed with the processing device 50 is set to be, for example, three times or more the data output rate RT corresponding to a reading speed from the IMU 1, the IMU 2, and the IMU3.

In the embodiment, each of the first memory to the n-th memory stores the identification information of each of the first inertial measurement unit to the n-th inertial measurement unit in association with a respective one piece of the first detection data to the n-th detection data. In the example in FIG. 4, the memory ME1 stores an identification number=1 which is the identification information of the IMU 1 in association with the detection data D1 of the IMU 1. The memory ME2 stores an identification number=2 which is the identification information of the IMU 2 in association with the detection data D2. The memory ME3 stores an identification number=3 which is the identification information of the IMU 3 in association with the detection data D3. Thus, the processing device 50 in the subsequent stage can implement appropriate synthesis processing on the detection data using the identification information of the inertial measurement unit associated with each piece of the detection data. That is, the detection data D1 to D9 from the IMU 1 to IMU 9 are transmitted to the processing device 50 via the relay circuits RL1 to RL3. Then, the processing device 50 performs the synthesis processing on the detection data D1 to D9 and outputs the data DQH after the synthesis processing. For example, the processing device 50 performs synthesis processing on inertial measurement information such as the acceleration data and the angular velocity data on each axis detected by the IMU 1 to the IMU 9. In this case, the processing device 50 performs the synthesis processing on the detection data D1 to D9 at each timing, such that the processing device 50 performs the synthesis processing on the detection data D1 to D9 of the IMU 1 to IMU 9 at a first timing, and then performs the synthesis processing on the detection data D1 to D9 of the IMU 1 to the IMU 9 at a second timing subsequent to the first timing. Accordingly, when the processing device 50 cannot identify the detection data D1 to D9 correspond to which ones of detection data of the IMU 1 to the IMU 9, the processing device 50 cannot execute the appropriate synthesis processing. In this regard, in the embodiment, since the identification information of the IMU corresponding to each piece of the detection data is associated with the piece of the detection data, the appropriate synthesis processing can be implemented.

In the embodiment, each of the first memory to the n-th memory may store read time information of a respective one piece of the first detection data to the n-th detection data in association with the piece of the detection data. In the example in FIG. 4, the memory ME1 stores the read time information of the detection data D1 from the IMU 1. Similarly, the memory ME2 stores the read time information of the detection data D2 from the IMU 2, and the memory ME3 stores the read time information of the detection data D3 from the IMU 3. The read time information is information for specifying a time when the detection data is read. For example, detection timings of the detection data of the plurality of inertial measurement units are different, and read timings of the detection data from the inertial measurement units are also different. Then, when the processing device 50 performs synthesis processing on a plurality of pieces of detection data from the plurality of inertial measurement units, the detection timings of the plurality of pieces of detection data are different. Accordingly, in order to perform more accurate synthesis processing, it is desirable to perform interpolation processing on each detection data in the time direction to obtain detection data at the same detection timing, and perform synthesis processing. A read time of the detection data corresponds to a detection timing of the detection data. Therefore, when the read time information of the detection data is associated with each piece of the detection data, the processing device 50 can implement appropriate interpolation processing on the detection data in the time direction using the read time information.

In the embodiment, the relay circuit receives the first data ready signal to the n-th data ready signal from the first inertial measurement unit to the n-th inertial measurement unit, and outputs, to the processing device 50, the first detection data to the n-th detection data as the output data in an order of receiving the first data ready signal to the n-th data ready signal. In the examples in FIGS. 4 and 5, the relay circuit RL1 receives the data ready signals RDY1, RDY2, and RDY3 from the IMU 1, the IMU 2, and the IMU 3. The IMU 1 to the IMU 3 correspond to the first inertial measurement unit to the n-th inertial measurement unit, and the data ready signals RDY1 to RDY3 correspond to the first data ready signal to the n-th data ready signal. Then, as shown in FIG. 5, the relay circuit RL1 outputs the detection data D1 to D3 as the output data DQ1 to the processing device 50 in the order of receiving the data ready signals RDY1 to RDY3. The detection data D1 to D3 correspond to the first detection data to the n-th detection data. For example, in FIG. 5, since the relay circuit RL1 receives the detection data in the order of RDY1, RDY2, and RDY3, the relay circuit RL1 outputs the detection data to the processing device 50 in the order of D1, D2, and D3. Here, the order of receiving the data ready signals RDY1, RDY2, and RDY3 corresponds to a detection order of the detection data D1, D2, and D3 in the IMU 1, IMU 2, and IMU 3, and is a free order. For example, when the data ready signals are received in an order of RDY2, RDY3, and RDY1, the relay circuit RL1 outputs the detection data as the output data DQ1 in the order of D2, D3, and D1. When the data ready signals are received in an order of RDY3, RDY2, and RDY1, the detection data is output as the output data DQ1 in an order of D3, D2, and D1. Thus, the relay circuit RL1 monitors the reception timings of the data ready signals RDY1 to RDY3 from the IMU 1 to the IMU 3, and thus can output each piece of the detection data D1 to D3 to the processing device 50 in the subsequent stage in the order corresponding to the detection timings of the detection data D1 to D3 in the IMU 1 to the IMU 3.

Specifically, in FIGS. 4 and 5, the data ready signals RDM1, RDM2, and RDM3 are input to the arbitration circuit 46 from the memories ME1, ME2, and ME3 in the same order as a reception order of the data ready signals RDY1, RDY2, and RDY3. Then, the arbitration circuit 46 arbitrates an output order of the detection data D1, D2, and D3 based on the data ready signals RDM1, RDM2, and RDM3. Specifically, the arbitration circuit 46 performs arbitration processing such that the detection data D1, D2, and D3 are output at the timings of the data ready signals RDM1, RDM2, and RDM3 corresponding to the data ready signals RDY1, RDY2, and RDY3.

In the embodiment, the relay circuit receives the first data ready signal to the n-th data ready signal from the first inertial measurement unit to the n-th inertial measurement unit, and outputs the output data ready signal to the processing device 50 based on the first data ready signal to the n-th data ready signal. In the examples in FIGS. 4 and 5, the relay circuit RL1 receives the data ready signals RDY1, RDY2, and RDY3 from the IMU 1, IMU 2, and IMU 3, and outputs the output data ready signal RDQ1 to the processing device 50 based on the RDY1, RDY2, and RDY3. Thus, the relay circuit RL1 can output, as the data ready signals of the detection data D1 to D3 of the IMU 1 to IMU 3, the output data ready signal RDQ1 generated based on the timings of the data ready signals RDY1 to RDY3 from the IMU 1 to IMU 3 to the processing device 50. Then, the processing device 50 can appropriately receive, based on the output data ready signal RDQ1, the detection data D1 to D3 output in a time-division manner from the relay circuit RL1.

Specifically, as shown in FIG. 5, the memories ME1, ME2, and ME3 output the data ready signals RDM1, RDM2, and RDM3 to the arbitration circuit 46 at timings corresponding to the data ready signals RDY1, RDY2, and RDY3 from the IMU 1, IMU 2, and IMU 3. The data ready signals RDM1, RDM2, and RDM3 become active signals at timings delayed by, for example, a given period from the data ready signals RDY1, RDY2, and RDY3. Then, the arbitration circuit 46 generates the output data ready signal RDQ1 based on the data ready signals RDM1 to RDM3 from the memories ME1 to ME3, and outputs the output data ready signal RDQ1 to the processing device 50. For example, the output data ready signal RDQ1 is a signal corresponding to a logical sum of the data ready signals RDM1 to RDM3.

In the embodiment, the number of pulses per unit time of the output data ready signal corresponds to a total number of pulses per unit time of the first data ready signal to the n-th data ready signal. In the examples in FIGS. 4 and 5, the number of pulses per unit time of the output data ready signal RDQ1 corresponds to a total number of pulses per unit time of the data ready signals RDY1, RDY2, and RDY3. For example, when receiving the first detection data D1 [1], D2 [1], and D3 [1] from the IMU 1, IMU 2, and IMU 3, the relay circuit RL1 receives the data ready signals RDY1, RDY2, and RDY3 having three pulses. In response to this, the number of pulses of the output data ready signal RDQ1 output to the processing device 50 also becomes 3. Similarly, when receiving the second detection data D1 [2], D2 [2], and D3 [2] from the IMU 1, IMU 2, and IMU 3, the relay circuit RL1 receives the data ready signals RDY1, RDY2, and RDY3 having three pulses. In response to this, the number of pulses of the output data ready signal RDQ1 output to the processing device 50 also becomes 3. Thus, the relay circuit RL1 can output, to the processing device 50, the output data ready signal RDQ1 having the number of pulses corresponding to the number of pulses of the data ready signals RDY1 to RDY3 from the IMU 1 to IMU 3, and output the detection data D1 to D3 to the processing device 50 in a time-division manner. Then, the processing device 50 can appropriately receive, based on the output data ready signal RDQ1 having the number of pulses, the detection data D1 to D3 output in a time-division manner from the relay circuit RL1.

In the configuration example in FIG. 4, when the data output rate of the IMU 1 to the IMU 3 is RT and, for example, 1/RT=500 μs, it is necessary to satisfy a condition in which a sum of a read time of the detection data from each of the IMU 1 to the IMU 3 and a transmission time to the processing device 50 is 1/RT=500 μs or less. This is because when this condition is not satisfied, data from each IMU is written before reading the data from each memory of the ME1 to the ME3, and the data may be lost.

Figure 6:
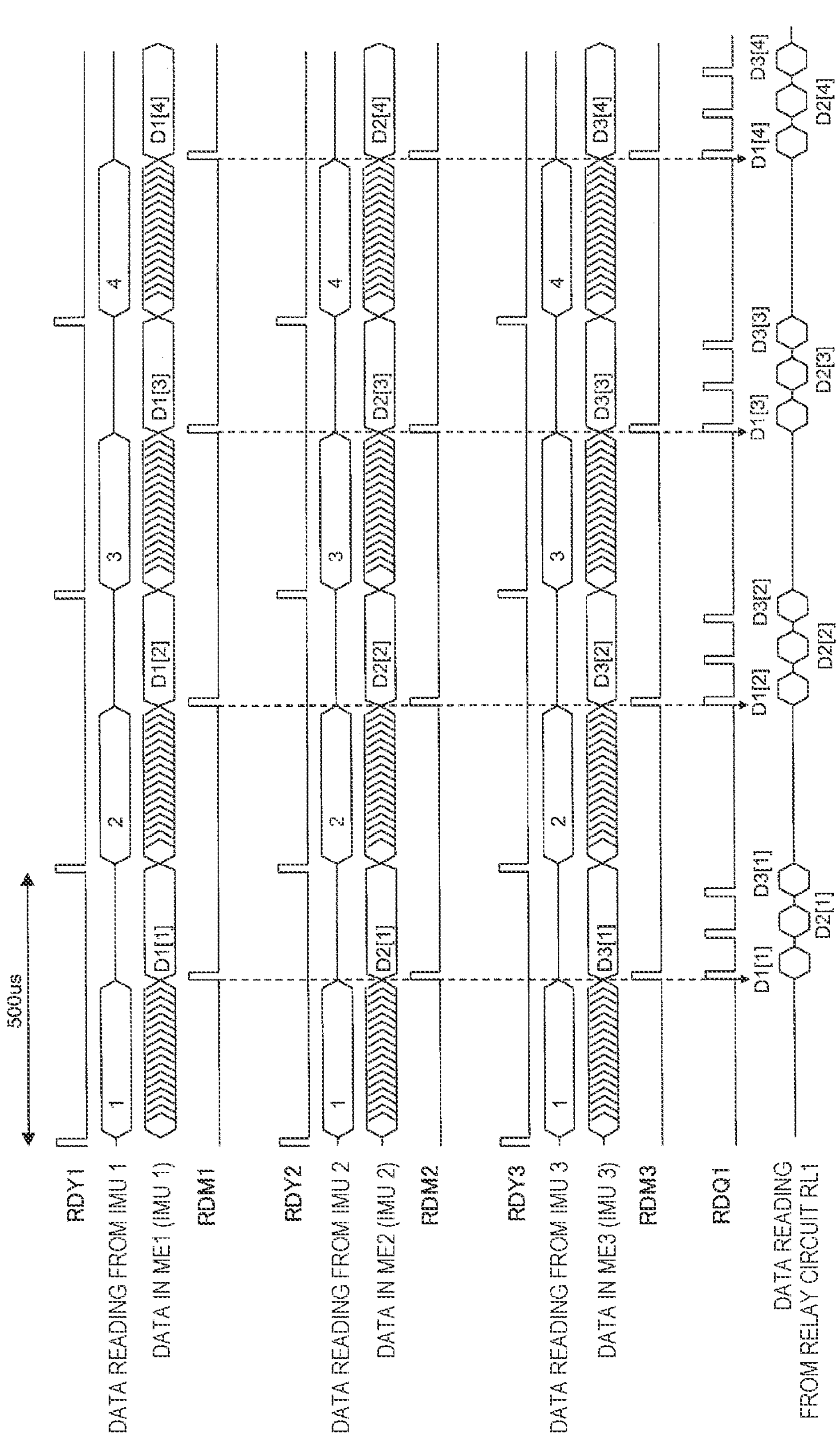
FIG. 6 is a timing chart showing an operation of the first configuration example.

When the data from the plurality of IMU 1 to IMU 3 are simultaneously received, it is necessary to transmit the data to the processing device 50 at a higher speed. FIG. 6 is a timing chart of the embodiment in such a worst case. In FIG. 6, the data ready signals RDY1, RDY2, and RDY3 from the IMU 1, the IMU 2, and the IMU 3 are simultaneously active, and the detection data D1, D2, and D3 are simultaneously read. In this case, the relay circuit RL1 generates the output data ready signal RDQ1 based on the data ready signals RDM1, RDM2, and RDM3 simultaneously activated from the memories ME1, ME2, and ME3, and transmits the detection data D1, D2, and D3 as the output data DQ1 in a time-division manner at a high speed. Then, the transmission is completed within 1/RT=500 μs.

Figure 7:
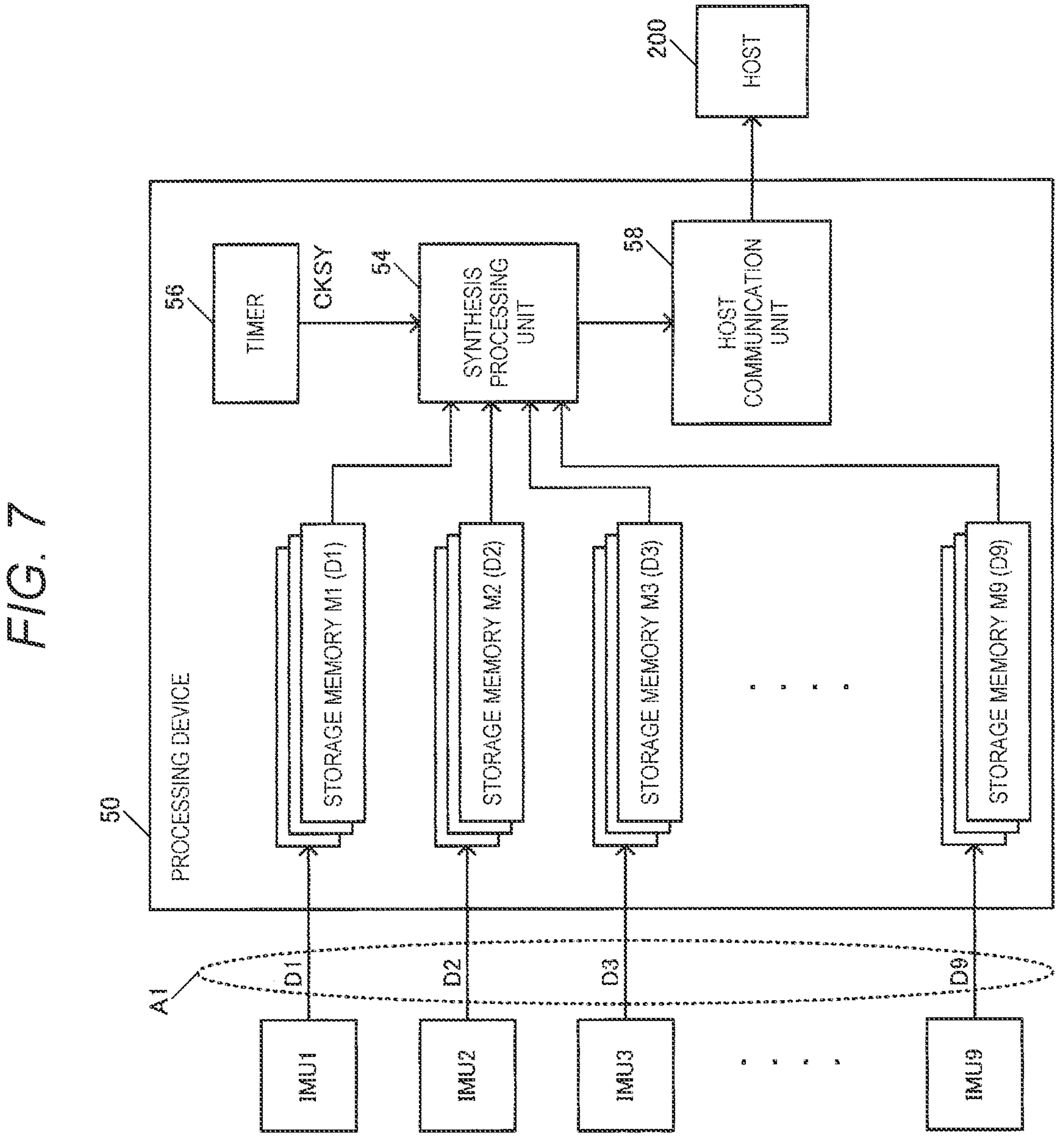
FIG. 7 is a configuration example of a comparative example according to the embodiment.

FIG. 7 is a diagram showing a configuration of a comparative example according to the embodiment. In FIG. 7, a relay circuit as in the embodiment is not provided, and the detection data D1 to D9 from the IMU 1 to the IMU 9 are directly input to the processing device 50. In the comparative example, as indicated by A1 in FIG. 7, a large number of communication ports for inputting the detection data D1 to D9 are required for the processing device 50. For example, in FIG. 7, nine communication ports such as SPIs are required. Accordingly, when the processing device 50 does not include such a large number of communication ports, it is difficult to cope with this. For example, since there is a limit to the communication ports with the IMUs mounted on the microcontroller which is the processing device 50, such a microcontroller cannot be used. In this case, if the SPI multi-slave connection method is adopted, the detection data from the IMU 1 to the IMU 9 can be input to the processing device 50 even when the communication ports of the processing device 50 are limited. However, this causes a problem that the data read rate decreases.

FIG. 8 shows a configuration example of the relay circuit RL1 in a detailed second configuration example according to the embodiment. FIG. 8 is different from the configuration in FIG. 4 in that the memory has a two-face configuration. In FIG. 8, as indicated by B1 and B2, the detection data D1 written into a memory ME12 is read in a period in which the detection data D1 from the IMU 1 is written into a memory ME11, and the detection data D1 written into the memory ME11 is read in a period in which the detection data D1 is written into the memory ME12. As indicated by B3 and B4, the detection data D2 written into a memory ME22 is read in a period in which the detection data D2 from the IMU 2 is written into a memory ME21, and the detection data D2 written into the memory ME21 is read in a period in which the detection data D2 is written into the memory ME22. In memories ME31 and ME32, similar writing and reading are also performed as shown in B5 and B6.

FIG. 9 is a timing chart showing an operation of the second configuration example in FIG. 8. The detection data D1 [1] is read from the IMU 1 in synchronization with the data ready signal RDY1, and the read detection data D1 [1] is stored in the memory ME11. At the same time, the IMU number=1 is also stored in the memory ME11. Then, at a timing when the storage of the detection data D1 [1] into the memory ME11 is completed, a data ready signal RDM11 from the memory ME11 becomes active, and the data ready signal RDM11 is output as the output data ready signal RDQ1 to the processing device 50 via the arbitration circuit 46. Then, in synchronization with the output data ready signal RDQ1, the detection data D1 [1] and the IMU number=1 which are contents of the memory ME11 are output to the processing device 50.

Contents of the memory ME12 are output to the processing device 50 at the next timing. Specifically, the detection data D1 [2] is read from the IMU 1 in synchronization with the data ready signal RDY1, and the read detection data D1 [2] is stored in the memory ME12. At the same time, the IMU number=1 is also stored in the memory ME12. Then, at a timing when the storage of the detection data D1 [2] into the memory ME12 is completed, a data ready signal RDM12 from the memory ME12 becomes active, and the data ready signal RDM12 is output as the output data ready signal RDQ1 to the processing device 50 via the arbitration circuit 46. Then, in synchronization with the output data ready signal RDQ1, the detection data D1 [2] and the IMU number=1 which are contents of the memory ME12 are output to the processing device 50. As described above, in FIGS. 8 and 9, the memory ME11 and the memory ME12 are used while being alternately switched, and the detection data D1 [1], D1 [2], D1 [3] . . . read from the IMU 1 can be continuously transmitted to the processing device 50.

In the memories ME21, ME22, ME31, and ME32, similarly to the memories ME11 and ME12, store processing and read processing on the detection data are performed in parallel. Since the processing is the same as the case of the memories ME11 and ME12, detailed description thereof is omitted.

In the second configuration example in FIGS. 8 and 9, a two-face memory is prepared, and writing to one memory and reading from the other memory can be performed simultaneously. Accordingly, when the data output rate is 1/RT=500 μs, data is held in each memory during a period excluding a period, in which data is written to the memory, from (1/RT)×2=1 ms. Accordingly, as compared with the first configuration example in FIGS. 4 and 5, it is possible to reduce time restriction on the data reading from the memory. On the other hand, the first configuration example in FIGS. 4 and 5 has an advantage that a necessary memory capacity can be reduced as compared with the second configuration example in FIGS. 8 and 9.

3. Structure Example of Inertial Measurement Device

Figure 10:
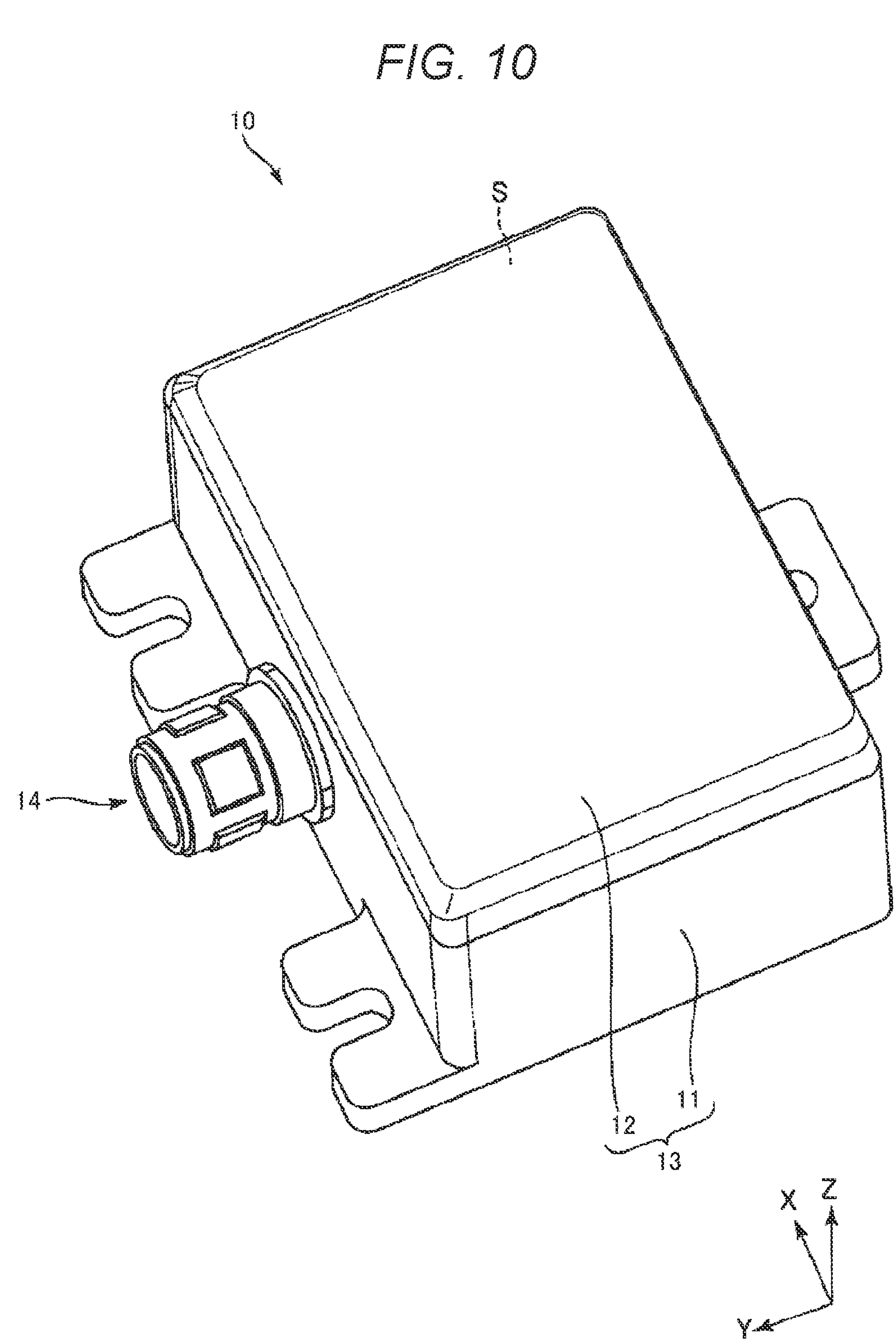
FIG. 10 is a perspective view showing the inertial measurement device.

FIG. 10 is a perspective view showing a specific example of the inertial measurement device 10. The inertial measurement device 10 includes the inertial measurement units 30-1 to 30-*n* described in FIGS. 1 and 2 or the like, the relay circuit 40, and a case 13 in which the processing device 50 is housed. The case 13 can also be referred to as a container. The case 13 includes a base 11 and a lid 12. Specifically, the case 13 includes the base 11 having a recess portion opened upward, and the lid 12 fixed to the base 11 in a manner of closing an opening of the base 11. A housing space S sealed by the base 11 and the lid 12 is a space for housing components such as the inertial measurement units 30-1 to 30-*n*, the relay circuit 40, and the processing device 50. The case 13 protects the components housed in the housing space S from dust, moisture, impact, ultraviolet radiation, or the like.

The base 11 and the lid 12 of the case 13 may be made of, for example, aluminum, but not limited thereto, and may be made of other metal materials such as an aluminum alloy and stainless steel, various ceramics, various resin materials, or composite materials thereof.

The inertial measurement device 10 includes a connector 14 attached to a side wall of the base 11. The connector 14 is a receptacle for electrical coupling between the outside and the inside of the case 13, and is for communication connection with an external device such as a host outside the inertial measurement device 10.

FIG. 11 is an exploded perspective view showing the inertial measurement device 10. FIG. 11 shows, as an example, a case in which the inertial measurement device 10 is provided with the three inertial measurement units 30-1, 30-2, and 30-3. However, the number of inertial measurement units provided in the inertial measurement device 10 is not limited thereto, and for example, four or more inertial measurement units can be provided. Each of the inertial measurement units 30-1, 30-2, and 30-3 can also be referred to as a sensor module.

As shown in FIG. 11, the inertial measurement device 10 includes a substrate 16. The substrate 16 can also be referred to as a circuit board. The inertial measurement units 30-1, 30-2, and 30-3 are mounted on the substrate 16. In FIGS. 11 and 10, axes orthogonal to each other along a main surface of the substrate 16 are the X-axis and the Y-axis, and a direction orthogonal to the substrate 16 is the Z-axis. For example, the X-axis is an axis in a direction along a long side which is a first side of the substrate 16, and the Y-axis is an axis in a direction along a short side which is a second side of the substrate 16. The first side and the second side are sides intersecting with each other. In FIG. 11, the inertial measurement unit 30-1 is disposed at, for example, an upper surface which is a first surface of the substrate 16. The inertial measurement units 30-2 and 30-3 are disposed at a lower surface which is a second surface of the substrate 16 along, for example, the X-axis direction. However, the arrangement of the inertial measurement unit is not limited to such an arrangement.

The processing device 50 implemented by a microcontroller or the like is disposed at the upper surface of the substrate 16. The relay circuit 40 is disposed at the upper surface of the substrate 16. The relay circuit 40 can be implemented as, for example, a relay device in which an IC of a relay circuit is housed in a package, but is not limited thereto. An internal connector 18 is provided at the upper surface of the substrate 16.

The inertial measurement units 30-1, 30-2, and 30-3, the relay circuit 40, and the processing device 50 are electrically coupled to one another via wiring or the like of the substrate 16. The processing device 50 is coupled to a communication board (not shown) via the wiring of the substrate 16, the internal connector 18, or the like. A communication IC that performs communication between the inertial measurement device 10 and an external device such as a host is disposed at the communication board.

As described above, the inertial measurement device 10 according to the embodiment includes the case 13 in which the inertial measurement units 30-1 to 30-3, the relay circuit 40, and the processing device 50 are housed. Thus, by providing a plurality of inertial measurement units in the inertial measurement device 10 and performing synthesis processing on detection data from the inertial measurement units, data in which noise such as random noise is reduced can be output to the outside. By providing the relay circuit 40 and the processing device 50 in the case of the inertial measurement device 10, the detection data from the inertial measurement units 30-1 to 30-3 can be input to the relay circuit 40, and the relay circuit 40 can output the detection data as output data in a time-division manner to the processing device 50 disposed in the same case 13. Accordingly, by the inertial measurement units 30-1 to 30-3, the relay circuit 40, and the processing device 50 that are disposed in the case 13, the detection data of the inertial information having less noise can be output to the outside at, for example, the same data output rate as that of the inertial measurement unit.

Figure 12:
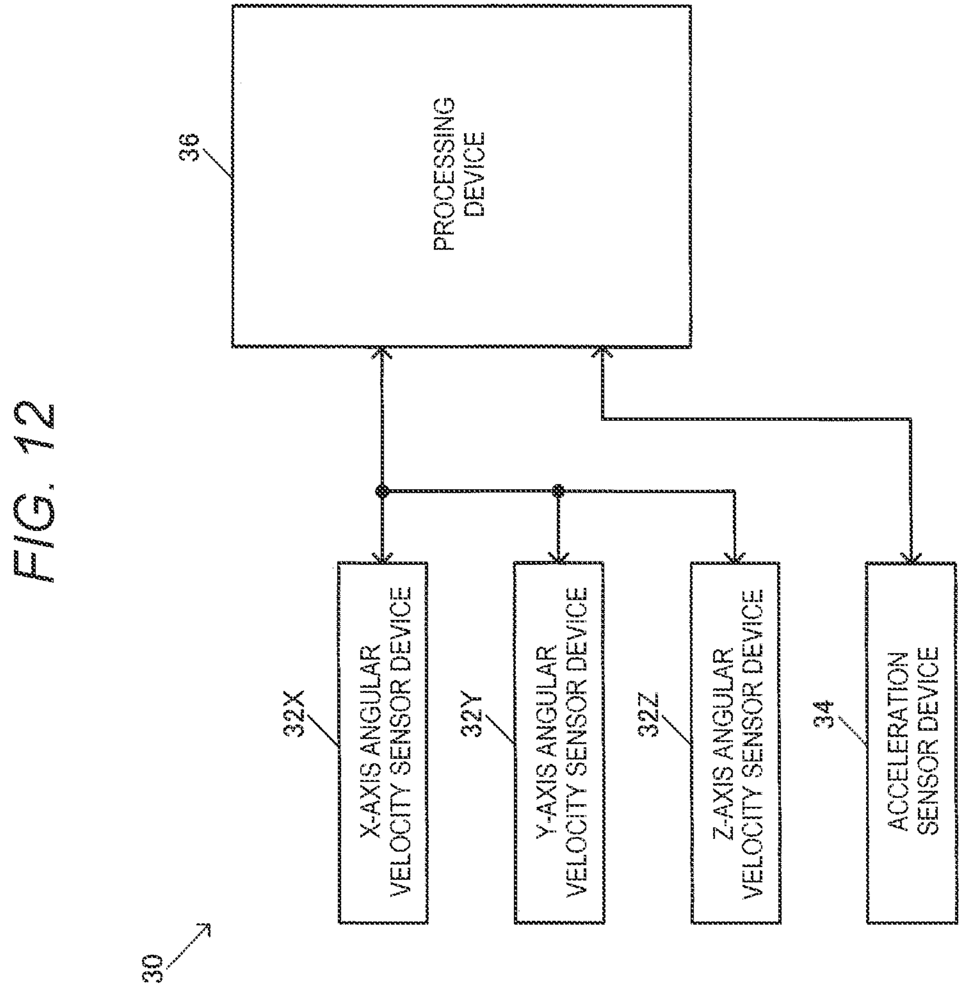
FIG. 12 is a configuration example of an inertial measurement unit.

FIG. 12 shows a configuration example of an inertial measurement unit 30. The inertial measurement unit 30 corresponds to each of the inertial measurement units 30-1, 30-2, and 30-3. The inertial measurement unit 30 includes an X-axis angular velocity sensor device 32X, a Y-axis angular velocity sensor device 32Y, a Z-axis angular velocity sensor device 32Z, an acceleration sensor device 34, and a processing device 36. The processing device 36 is, for example, a microcontroller, and the processing device 36 and each sensor device are electrically coupled to each other by, for example, a digital interface bus.

The X-axis angular velocity sensor device 32X detects an angular velocity around the X-axis and outputs X-axis angular velocity data. The X-axis angular velocity sensor device 32X includes a sensor element that detects the angular velocity around the X-axis. The sensor element is, for example, a gyro sensor element including a piezoelectric vibrator such as a quartz crystal vibrator. However, the sensor element is not limited thereto, and may be an Si-MEMS gyro sensor element of a static capacitance detection type formed of a silicon substrate or the like. For example, the sensor element may be obtained by multi-connection of a plurality of Si-MEMS gyro sensor elements. The X-axis angular velocity sensor device 32X includes an analog circuit including an amplifier circuit that amplifies a detection signal from the sensor element, a synchronous detection circuit that performs synchronous detection on the detection signal, or the like. The X-axis angular velocity sensor device 32X includes an A/D conversion circuit that converts an analog signal from an analog circuit into digital data. Output data of the A/D conversion circuit or data obtained by performing correction processing such as temperature correction, offset correction, or sensitivity correction on the output data becomes the X-axis angular velocity data.

The Y-axis angular velocity sensor device 32Y detects an angular velocity around the Y-axis and outputs Y-axis angular velocity data. The Y-axis angular velocity sensor device 32Y includes a sensor element that detects the angular velocity around the Y-axis. As the sensor element, various types of sensor elements can be used as described above. The Z-axis angular velocity sensor device 32Z detects an angular velocity around the Z-axis and outputs Z-axis angular velocity data. The Z-axis angular velocity sensor device 32Z includes a sensor element that detects the angular velocity around the Z-axis. As the sensor element, various types of sensor elements can be used as described above. Detailed configurations and operations of the Y-axis angular velocity sensor device 32Y and the Z-axis angular velocity sensor device 32Z are the same as those of the X-axis angular velocity sensor device 32X, and thus detailed description thereof will be omitted.

The acceleration sensor device 34 detects an acceleration in the X-axis direction, an acceleration in the Y-axis direction, and an acceleration in the Z-axis direction, and outputs X-axis acceleration data, Y-axis acceleration data, and Z-axis acceleration data. The acceleration sensor device 34 is, for example, a single device, and is a static capacitance type Si-MEMS sensor device capable of detecting accelerations in the X-axis direction, the Y-axis direction, and the Z-axis direction. However, the embodiment is not limited thereto. The acceleration sensor device 34 may be a frequency-variable quartz crystal acceleration sensor, a piezoresistance acceleration sensor, or a thermal detection acceleration sensor. The acceleration sensor device 34 includes an X-axis acceleration detection sensor element, a Y-axis acceleration detection sensor element, and a Z-axis acceleration detection sensor element. A plurality of sensor elements may be provided as an acceleration detection sensor element for each axis. The acceleration sensor device 34 includes an analog circuit including an amplifier circuit that amplifies a detection signal from the acceleration detection sensor element for each axis, or the like, and an A/D conversion circuit that converts an analog signal from the analog circuit into digital data. The A/D conversion circuit A/D-converts, for example, an X-axis acceleration analog signal, a Y-axis acceleration analog signal, and a Z-axis acceleration analog signal into digital data in a time-division manner. Output data of the A/D conversion circuit or data obtained by performing correction processing such as temperature correction on the output data becomes the X-axis acceleration data, the Y-axis acceleration data, and the Z-axis acceleration data. Here, the X-axis, the Y-axis, and the Z-axis are an X-axis, a Y-axis, and a Z-axis as detection axes of the inertial measurement unit 30 which is a sensor module.

The processing device 36 is a controller serving as a master for the X-axis angular velocity sensor device 32X, the Y-axis angular velocity sensor device 32Y, the Z-axis angular velocity sensor device 32Z, and the acceleration sensor device 34. The processing device 36 is an integrated circuit device, and can be implemented by, for example, a processor such as an MPU or a CPU. Alternatively, the processing device 36 may be implemented by an ASIC using automatic arrangement wiring such as a gate array.

Figure 13:
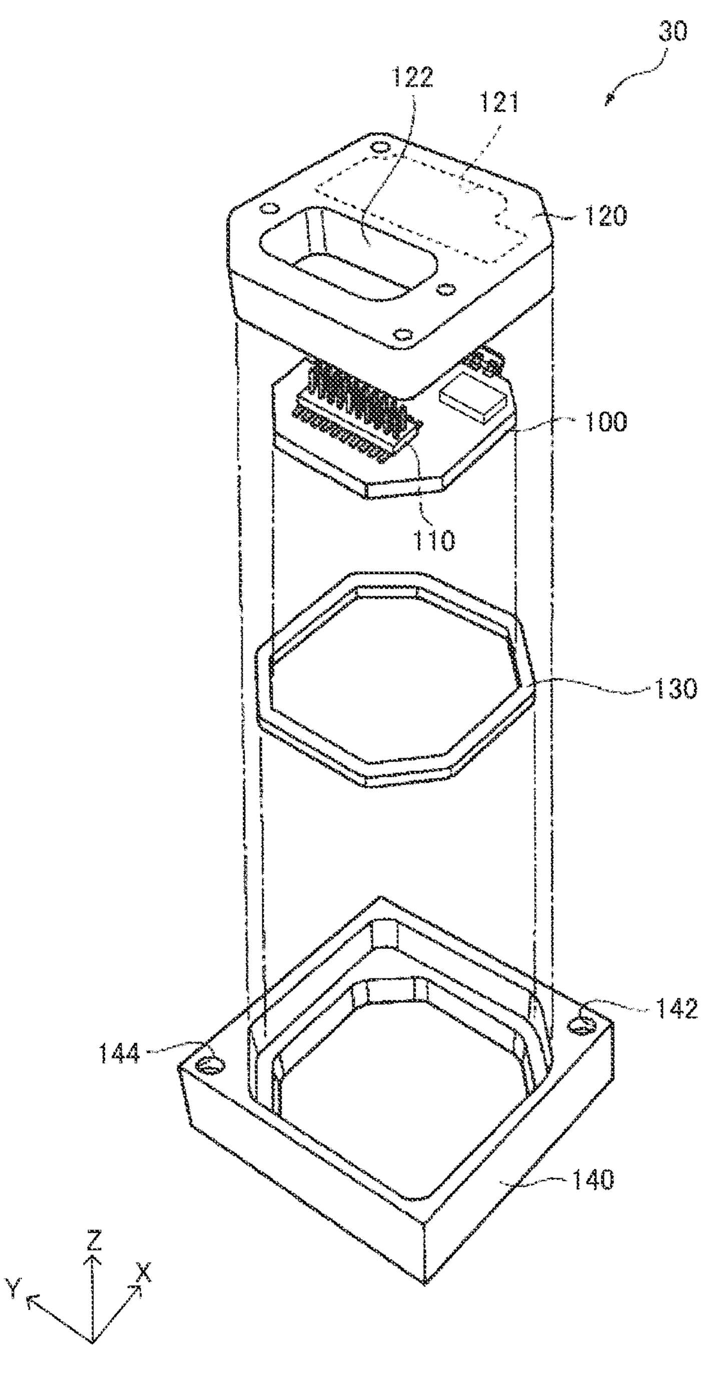
FIG. 13 is an exploded perspective view of the inertial measurement unit.

FIG. 13 is an exploded perspective view showing a specific example of the inertial measurement unit 30. The inertial measurement unit 30 in FIG. 13 includes a circuit board 100, an inner case 120, an annular buffer material 130, and an outer case 140. The inertial measurement unit 30 has a configuration in which the circuit board 100 is mounted inside the outer case 140 with the annular buffer material 130 interposed therebetween. Sensor devices such as an angular velocity sensor device and an acceleration sensor device are mounted on the circuit board 100.

The inertial measurement unit 30 is a rectangular parallelepiped body whose planar shape is a square shape, and screw holes 142 and 144 serving as fixing portions are formed in the vicinity of two vertices located in diagonal directions of the square shape. Two screws pass through the screw holes 142 and 144 to fix the inertial measurement unit 30 to a mounting surface during use. An opening portion 122 is formed in a surface of the inertial measurement unit 30 in a top view. A plug-type connector 110 is disposed inside the opening portion 122. In the connector 110, a plurality of pins are arranged side by side. A socket-type connector is coupled to the connector 110, and power is supplied to the inertial measurement unit 30 and electric signals such as output of detection data detected by the inertial measurement unit 30 are transmitted and received. The outer case 140 is, for example, a base obtained by scraping aluminum into a box shape. Similarly to an overall shape of the inertial measurement unit 30 described above, an outer shape of the outer case 140 is a rectangular parallelepiped body whose planar shape is a square shape.

In FIG. 13, a recess portion 121 is formed on a bottom surface side of the inner case 120. In a plan view seen from a thickness direction of the circuit board 100, a sensor device group including an angular velocity sensor device and an acceleration sensor device is disposed in a region overlapping the recess portion 121. A space formed by the circuit board 100 and the recess portion 121 is filled with a filling member, and the filling member is solidified. Accordingly, a part or all of the circuit board 100 and the sensor device group are covered with the filling member, and a resonance frequency can be shifted such that the resonance frequency deviates from a band of noise vibration from the outside.

As described above, an inertial measurement device according to the embodiment includes: a first inertial measurement unit to an n-th inertial measurement unit; a relay circuit configured to receive first detection data to n-th detection data from the first inertial measurement unit to the n-th inertial measurement unit and output the first detection data to the n-th detection data as output data in a time-division manner; and a processing device configured to receive the output data from the relay circuit and perform synthesis processing on the first detection data to the n-th detection data.

According to the embodiment, the first detection data to the n-th detection data from the first inertial measurement unit to the n-th inertial measurement unit are input to the relay circuit, and the relay circuit outputs the first detection data to the n-th detection data as the output data in a time-division manner. Then, the processing device performs the synthesis processing on the first detection data to the n-th detection data based on the output data from the relay circuit. Thus, the first detection data to the n-th detection data from the first inertial measurement unit to the n-th inertial measurement unit can be input as the output data to the processing device in a time-division manner via the relay circuit. Then, it is possible to reduce noise of the data after the synthesis processing by performing the synthesis processing on the first detection data to the n-th detection data by the processing device. Accordingly, it is possible to provide the inertial measurement device capable of easily reducing the noise of the output data by increasing the number of inertial measurement units provided in the inertial measurement device.

In the embodiment, the relay circuit may include a first communication circuit to an n-th communication circuit configured to receive the first detection data to the n-th detection data from the first inertial measurement unit to the n-th inertial measurement unit, and an output-side communication circuit configured to transmit the output data to the processing device.

Thus, the first detection data to the n-th detection data from the first inertial measurement unit to the n-th inertial measurement unit can be received by the first communication circuit to the n-th communication circuit, and the first detection data to the n-th detection data can be output as the output data to the processing device by the output-side communication circuit.

In the embodiment, the processing device may perform the synthesis processing on first axis detection data included in the first detection data to the n-th detection data, and the synthesis processing on second axis detection data included in the first detection data to the n-th detection data.

Thus, the synthesis processing on the first axis detection data and the second axis detection data included in the first detection data to the n-th detection data can be performed, and noise of the first axis detection data and the second axis detection data after the synthesis processing can be reduced.

In the embodiment, the synthesis processing may be averaging processing.

By performing such averaging processing, random noise of the data output by the processing device can be reduced as compared with, for example, the case of using detection data from one inertial measurement unit.

In the embodiment, the relay circuit may include a first memory to an n-th memory configured to store the first detection data to the n-th detection data from the first inertial measurement unit to the n-th inertial measurement unit.

When the first memory to the n-th memory are provided, the first detection data to the n-th detection data from the first inertial measurement unit to the n-th inertial measurement unit can be stored in the first memory to the n-th memory, and the stored first detection data to the n-th detection data can be output as the output data to the processing device in a time-division manner.

In the embodiment, each of the first memory to the n-th memory may store identification information of a respective one of the first inertial measurement unit to the n-th inertial measurement unit in association with a respective one piece of the first detection data to the n-th detection data.

Thus, the processing device in the subsequent stage can implement appropriate synthesis processing on the detection data using the identification information of the inertial measurement unit associated with each piece of the detection data.

In the embodiment, the relay circuit may receive a first data ready signal to an n-th data ready signal from the first inertial measurement unit to the n-th inertial measurement unit, and output, to the processing device, the first detection data to the n-th detection data as the output data in an order of receiving the first data ready signal to the n-th data ready signal.

Thus, the relay circuit monitors reception timings of the first data ready signal to the n-th data ready signal from the first inertial measurement unit to the n-th inertial measurement unit, and thus can output each piece of the detection data to the processing device in the subsequent stage in an order corresponding to the detection timings of the first detection data to the n-th detection data in the first inertial measurement unit to the n-th inertial measurement unit.

In the embodiment, the relay circuit may receive a first data ready signal to an n-th data ready signal from the first inertial measurement unit to the n-th inertial measurement unit, and output an output data ready signal to the processing device based on the first data ready signal to the n-th data ready signal.

Thus, the relay circuit can output, to the processing device, the output data ready signal generated based on timings of the first data ready signal to the n-th data ready signal from the first inertial measurement unit to the n-th inertial measurement unit as a data ready signal of the first detection data to the n-th detection data of the first inertial measurement unit to the n-th inertial measurement unit.

In the embodiment, the number of pulses per unit time of the output data ready signal may correspond to a total number of pulses per unit time of the first data ready signal to the n-th data ready signal.

Thus, the relay circuit can output, to the processing device, the output data ready signal having the number of pulses corresponding to the number of pulses of the first data ready signal to the n-th data ready signal from the first inertial measurement unit to the n-th inertial measurement unit, and output the first detection data to the n-th detection data to the processing device in a time-division manner.

In the embodiment, the first inertial measurement unit to the n-th inertial measurement unit may output the first detection data to the n-th detection data at a data output rate RT, and the relay circuit may output the output data at a data output rate RTQ of n×RT or more.

Thus, the first detection data to the n-th detection data which are targets of the synthesis processing in the processing device can be input to the processing device at a high data output rate.

In the embodiment, the processing device may output data after the synthesis processing at the data output rate RT or less.

Thus, the noise of the data output from the processing device can be reduced by the synthesis processing, and the data after the synthesis processing can be output at a data output rate or the like equivalent to that of the first inertial measurement unit to the n-th inertial measurement unit.

In the embodiment, the inertial measurement device may include: a K-th inertial measurement unit to an m-th inertial measurement unit; and a second relay circuit configured to receive k-th detection data to m-th detection data from the k-th inertial measurement unit to the m-th inertial measurement unit and output the k-th detection data to the m-th detection data as second output data in a time-division manner. The processing device may receive the output data and the second output data, and perform the synthesis processing on the first detection data to the n-th detection data and the k-th detection data to the m-th detection data.

Thus, since the synthesis processing is performed using the k-th detection data to the m-th detection data from the k-th inertial measurement unit to the m-th inertial measurement unit in addition to the first detection data to the n-th detection data from the first inertial measurement unit to the n-th inertial measurement unit, it is possible to implement a further reduction in noise of the data after the synthesis processing.

In the embodiment, the second relay circuit may include a k-th communication circuit to an m-th communication circuit configured to receive the k-th detection data to the m-th detection data from the k-th inertial measurement unit to the m-th inertial measurement unit, and a second output-side communication circuit configured to transmit the second output data to the processing device.

Thus, the k-th detection data to the m-th detection data from the k-th inertial measurement unit to the m-th inertial measurement unit can be received by the k-th communication circuit to the m-th communication circuit, and the k-th detection data to the m-th detection data can be output as the output data to the processing device by the second output-side communication circuit.

In the embodiment, the inertial measurement device may include a case in which the first inertial measurement unit to the n-th inertial measurement unit, the relay circuit, and the processing device are housed.

Thus, a plurality of inertial measurement units are provided in the case of the inertial measurement device, and the detection data from the inertial measurement units is relayed by the relay circuit provided in the case and is input to the processing device provided in the case. Therefore, by performing the synthesis processing in the processing device, the data whose noise is reduced can be output to the outside.

Although the embodiment has been described in detail as described above, it can be readily apparent to those skilled in the art that many modifications may be made without departing substantially from novel matters and effects of the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. All combinations of the embodiment and the modifications are also included in the scope of the present disclosure. The configurations and operations of the inertial measurement device, the inertial measurement unit, the relay circuit, the processing device, or the like are not limited to those described in the embodiment, and various modifications can be made.

What is claimed is:

1. An inertial measurement device comprising:

a first inertial measurement unit to an n-th inertial measurement unit;

a relay circuit configured to receive first detection data to n-th detection data from the first inertial measurement unit to the n-th inertial measurement unit and output the first detection data to the n-th detection data as output data in a time-division manner; and a processing device configured to receive the output data from the relay circuit and perform synthesis processing on the first detection data to the n-th detection data.

2. The inertial measurement device according to claim 1, wherein the relay circuit includes a first communication circuit to an n-th communication circuit configured to receive the first detection data to the n-th detection data from the first inertial measurement unit to the n-th inertial measurement unit, and an output-side communication circuit configured to transmit the output data to the processing device.

3. The inertial measurement device according to claim 1, wherein the processing device is configured to perform the synthesis processing on first axis detection data included in the first detection data to the n-th detection data, and the synthesis processing on second axis detection data included in the first detection data to the n-th detection data.

4. The inertial measurement device according to claim 1, wherein the synthesis processing is averaging processing.

5. The inertial measurement device according to claim 1, wherein the relay circuit includes a first memory to an n-th memory configured to store the first detection data to the n-th detection data from the first inertial measurement unit to the n-th inertial measurement unit.

6. The inertial measurement device according to claim 5, wherein each of the first memory to the n-th memory is configured to store identification information of a respective one of the first inertial measurement unit to the n-th inertial measurement unit in association with a respective one piece of the first detection data to the n-th detection data.

7. The inertial measurement device according to claim 1, wherein the relay circuit is configured to receive a first data ready signal to an n-th data ready signal from the first inertial measurement unit to the n-th inertial measurement unit, and output, to the processing device, the first detection data to the n-th detection data as the output data in an order of receiving the first data ready signal to the n-th data ready signal.

8. The inertial measurement device according to claim 1, wherein the relay circuit is configured to receive a first data ready signal to an n-th data ready signal from the first inertial measurement unit to the n-th inertial measurement unit, and output an output data ready signal to the processing device based on the first data ready signal to the n-th data ready signal.

9. The inertial measurement device according to claim 8, wherein the number of pulses per unit time of the output data ready signal corresponds to a total number of pulses per unit time of the first data ready signal to the n-th data ready signal.

10. The inertial measurement device according to claim 1, wherein the first inertial measurement unit to the n-th inertial measurement unit are configured to output the first detection data to the n-th detection data at a data output rate RT, and the relay circuit is configured to output the output data at a data output rate RTQ of n×RT or more.

11. The inertial measurement device according to claim 10, wherein the processing device is configured to output data after the synthesis processing at the data output rate RT or less.

12. The inertial measurement device according to claim 1, further comprising:

a K-th inertial measurement unit to an m-th inertial measurement unit; and a second relay circuit configured to receive k-th detection data to m-th detection data from the k-th inertial measurement unit to the m-th inertial measurement unit and output the k-th detection data to the m-th detection data as second output data in a time-division manner, wherein the processing device is configured to receive the output data and the second output data, and perform the synthesis processing on the first detection data to the n-th detection data and the k-th detection data to the m-th detection data.

13. The inertial measurement device according to claim 12, wherein the second relay circuit includes a k-th communication circuit to an m-th communication circuit configured to receive the k-th detection data to the m-th detection data from the k-th inertial measurement unit to the m-th inertial measurement unit, and a second output-side communication circuit configured to transmit the second output data to the processing device.

14. The inertial measurement device according to claim 1, further comprising:

a case in which the first inertial measurement unit to the n-th inertial measurement unit, the relay circuit, and the processing device are housed.

* * * * *